United States Patent
Cheng et al.

(10) Patent No.: US 12,385,838 B1
(45) Date of Patent: Aug. 12, 2025

(54) APPARATUS AND METHOD FOR MICROSECOND-SCALE MID-INFRARED ENERGY DEPOSITION (MIRED) SPECTROSCOPY AND MICROSCOPY

(71) Applicant: Trustees of Boston University, Boston, MA (US)

(72) Inventors: Ji-Xin Cheng, Newton, MA (US); Jiaze Yin, Malden, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 19/036,518

(22) Filed: Jan. 24, 2025

Related U.S. Application Data

(60) Provisional application No. 63/624,982, filed on Jan. 25, 2024.

(51) Int. Cl.
| | |
|---|---|
| *G01J 3/44* | (2006.01) |
| *G01N 21/64* | (2006.01) |
| *G01N 21/65* | (2006.01) |
| *G02B 21/00* | (2006.01) |

(52) U.S. Cl.
CPC ......... *G01N 21/6458* (2013.01); *G01N 21/65* (2013.01); *G02B 21/0076* (2013.01); *G01N 2021/6419* (2013.01); *G01N 2021/655* (2013.01); *G01N 2201/06113* (2013.01)

(58) Field of Classification Search
CPC .... G01N 21/6458; G01N 21/65; G01N 21/64; G01N 21/35; G01N 2021/6419; G01N 2021/655; G01N 2201/06113; G01J 3/44; G01J 3/26; G02B 21/0076; G02B 21/00
See application file for complete search history.

(56) References Cited

U.S. PATENT DOCUMENTS

| | | | |
|---|---|---|---|
| 2018/0052186 A1* | 2/2018 | Su | G01N 21/35 |
| 2020/0073103 A1* | 3/2020 | Wang | G01N 21/1702 |
| 2021/0208064 A1 | 7/2021 | Bhargava et al. | |
| 2023/0045375 A1 | 2/2023 | Cheng et al. | |
| 2023/0175965 A1 | 6/2023 | Cheng et al. | |

FOREIGN PATENT DOCUMENTS

| | | | | |
|---|---|---|---|---|
| JP | 2023052309 A | * | 4/2023 | G01N 21/39 |
| WO | 2022221290 A1 | | 10/2022 | |

OTHER PUBLICATIONS

International Search Report and Written Opinion mailed Mar. 26, 2025 for International Application No. PCT/US2024/012927 for Trustees of Boston University filed Jan. 24, 2024, 17 pages.

* cited by examiner

*Primary Examiner* — Abdullahi Nur
(74) *Attorney, Agent, or Firm* — Cesari and McKenna, LLP; Steven M. Mills

(57) ABSTRACT

A spectroscopy and microscopy system and method include a source of pulsed infrared light generating pulsed infrared excitation light for exciting a sample, such that the pulsed infrared light selectively heats the sample by absorption of the pulsed infrared light and allows the sample to cool. A source of probe light generates probe light for illuminating the sample. A detection element detects a signal indicative of selective heating of the sample by the excitation light. A processor receives the signal indicative of the selective heating of the sample, computes a time rate of local temperature rise in the sample to obtain instantaneous absorption in the sample, and, using the instantaneous absorption, generates a spectrum related to the sample.

30 Claims, 24 Drawing Sheets

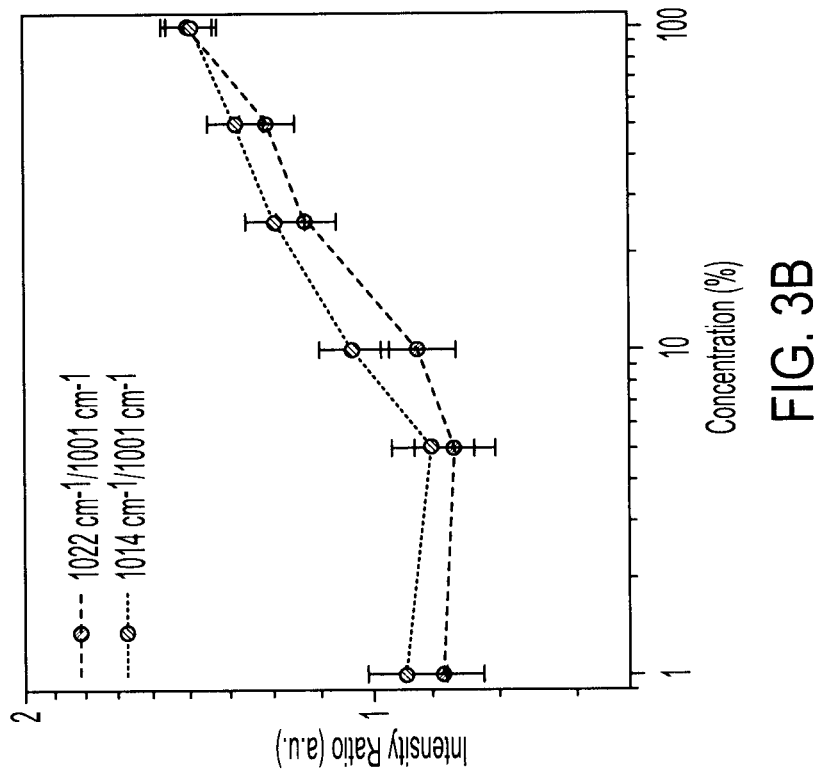
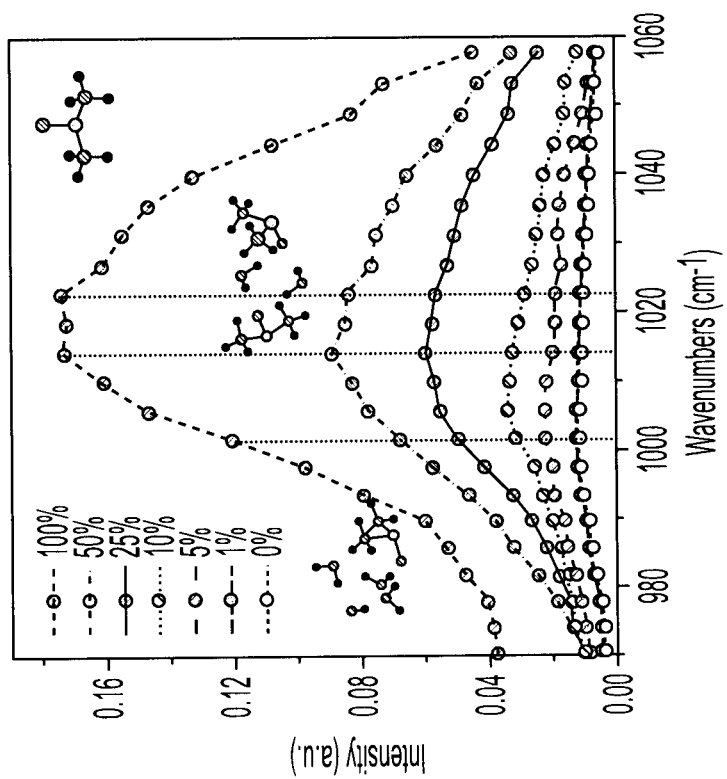
FIG. 3B
FIG. 3A

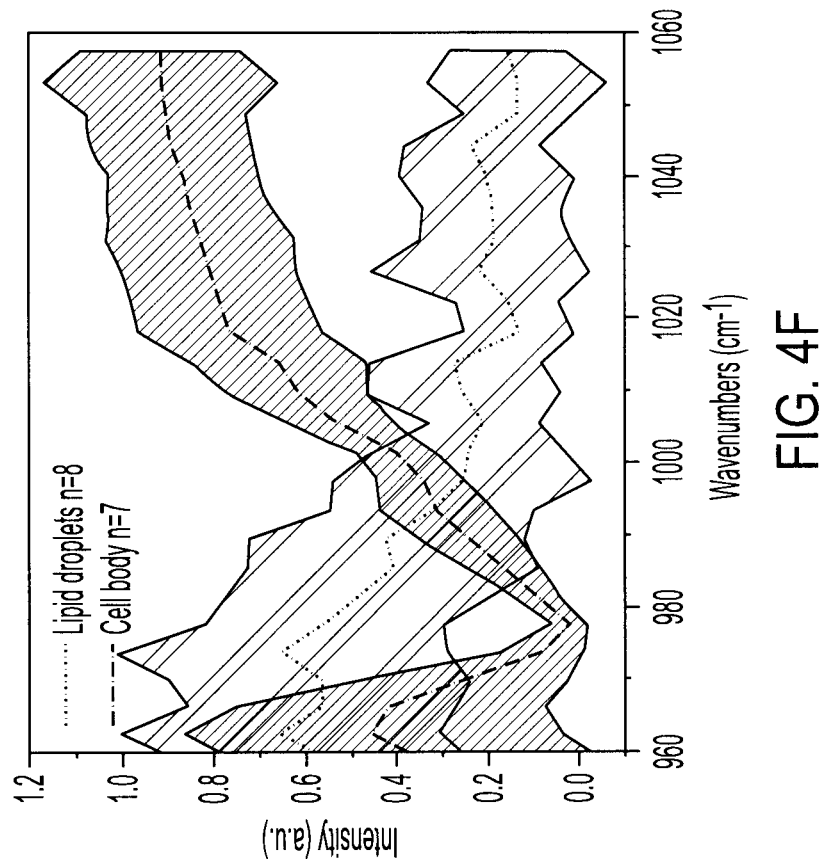
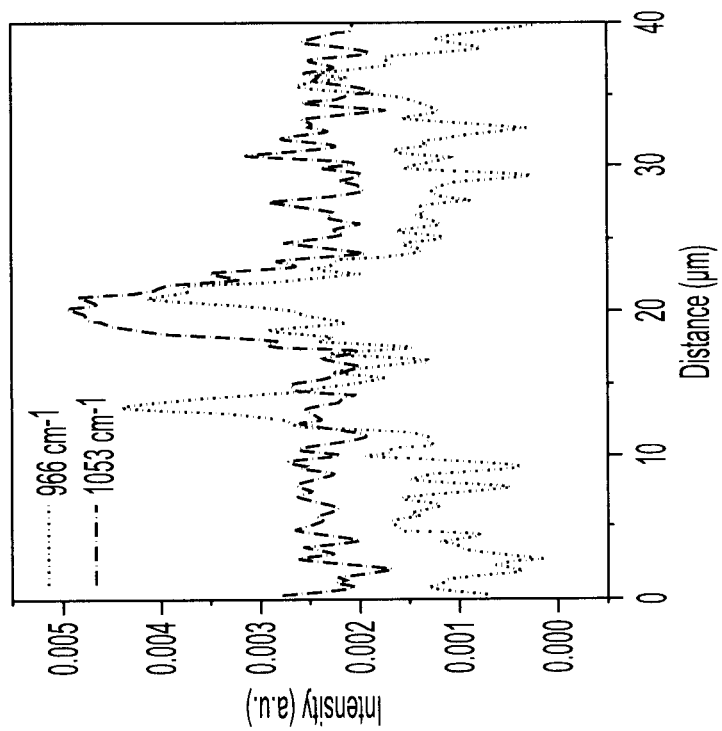
FIG. 4E
FIG. 4F

[S3]

[S3]

[S7]

APPARATUS AND METHOD FOR MICROSECOND-SCALE MID-INFRARED ENERGY DEPOSITION (MIRED) SPECTROSCOPY AND MICROSCOPY

CROSS REFERENCE TO RELATED APPLICATIONS

This application claims the benefit of U.S. Provisional Application No. 63/624,982, filed on Jan. 25, 2024, the entire contents of which are incorporated herein by reference.

GOVERNMENT SUPPORT

This invention was made with Government support under Grant number R33CA261726 awarded by the National Institutes of Health. The Government has certain rights in this invention.

FIELD OF THE TECHNOLOGY

The subject disclosure relates generally to infrared spectroscopy and microscopy systems and methods and, particularly, to improvements and enhancements to infrared spectroscopy and microscopy systems and methods and, more particularly, to mid-infrared energy deposition spectroscopy and microscopy systems and methods.

BACKGROUND OF THE TECHNOLOGY

It is generally assumed that the spectral acquisition speed in photothermal spectroscopy is fundamentally limited by the thermal diffusion process. Despite the extremely high sensitivity and resolution offered by photothermal detection, achieving rapid spectral acquisition via photothermal spectroscopy has been considered a major obstacle. This limitation arises from the time needed for cooling during temperature modulation, which takes microseconds or longer. Consequently, even with an ultrafast wavelength-sweeping infrared (IR) source and single pulse detection speed, the effective detection bandwidth is restricted to only hundreds of kilohertz per color.

SUMMARY OF THE TECHNOLOGY

According to a first aspect, a microscopy system is provided. The system includes a source of pulsed infrared light for generating pulsed infrared excitation light for exciting a sample, such that the pulsed infrared light selectively heats the sample by absorption of the pulsed infrared light and allows the sample to cool. A source of probe light generates probe light for illuminating the sample. A detection element detects a signal indicative of selective heating of the sample by the excitation light. A processor receives the signal indicative of the selective heating of the sample, computes a time rate of local temperature rise in the sample to obtain instantaneous absorption in the sample, and, using the instantaneous absorption, generates an image of the sample.

In some exemplary embodiments, the probe light has a wavelength of 532 nm.

In some exemplary embodiments, the source of the pulsed infrared light comprises a quantum cascade laser (QCL) array. The QCL array can be comprised a plurality of laser channels, and, in some particular embodiments, comprises 32 channels. The plurality of channels can cover a fingerprint region from 940 $cm^{-1}$ to 1056 $cm^{-1}$. Each laser of the laser array can have a programmable pulse duration from 20 ns to 500 ns.

In some exemplary embodiments, the excitation light has a wavelength in a range of 1000 nm to 2500 nm.

According to another aspect, a microscopy method is provided. The method comprises: (i) generating pulsed infrared excitation light for exciting a sample, such that the pulsed infrared light selectively heats the sample by absorption of the pulsed infrared light and allows the sample to cool; (ii) generating probe light for illuminating the sample; (iii) detecting a signal indicative of selective heating of the sample by the excitation light; and (iv) receiving the signal indicative of the selective heating of the sample, using the signal indicative of the selective heating of the sample, computing a time rate of local temperature rise in the sample to obtain instantaneous absorption in the sample, and, using the instantaneous absorption, generating an image of the sample.

In some exemplary embodiments, the source of the pulsed infrared light comprises a quantum cascade laser (QCL) array. The QCL array can comprise a plurality of laser channels, and, in some particular embodiments, comprises 32 channels. The plurality of channels can cover a fingerprint region from 940 $cm^{-1}$ to 1056 $cm^{-1}$. Each laser of the laser array can have a programmable pulse duration from 20 ns to 500 ns.

In some exemplary embodiments, the excitation light has a wavelength in a range of 1000 nm to 2500 nm.

According to another aspect, a spectroscopy system is provided. The system includes a source of pulsed infrared light for generating pulsed infrared excitation light for exciting a sample, such that the pulsed infrared light selectively heats the sample by absorption of the pulsed infrared light and allows the sample to cool. A source of probe light generates probe light for illuminating the sample. A detection element detects a signal indicative of selective heating of the sample by the excitation light. A processor receives the signal indicative of the selective heating of the sample, computes a time rate of local temperature rise in the sample to obtain instantaneous absorption in the sample, and, using the instantaneous absorption, generates a spectrum related to the sample.

In some exemplary embodiments, the probe light has a wavelength of 532 nm.

In some exemplary embodiments, the source of the pulsed infrared light comprises a quantum cascade laser (QCL) array. The QCL array can be comprised a plurality of laser channels, and, in some particular embodiments, comprises 32 channels. The plurality of channels can cover a fingerprint region from 940 $cm^{-1}$ to 1056 $cm^{-1}$. Each laser of the laser array can have a programmable pulse duration from 20 ns to 500 ns.

In some exemplary embodiments, the excitation light has a wavelength in a range of 1000 nm to 2500 nm.

According to another aspect, a spectroscopy method is provided. The method comprises: (i) generating pulsed infrared excitation light for exciting a sample, such that the pulsed infrared light selectively heats the sample by absorption of the pulsed infrared light and allows the sample to cool; (ii) generating probe light for illuminating the sample; (iii) detecting a signal indicative of selective heating of the sample by the excitation light; and (iv) receiving the signal indicative of the selective heating of the sample, using the signal indicative of the selective heating of the sample, computing a time rate of local temperature rise in the sample to obtain instantaneous absorption in the sample, and, using the instantaneous absorption, generating a spectrum related to the sample.

In some exemplary embodiments, the source of the pulsed infrared light comprises a quantum cascade laser (QCL) array. The QCL array can comprise a plurality of laser channels, and, in some particular embodiments, comprises 32 channels. The plurality of channels can cover a fingerprint region from 940 $cm^{-1}$ to 1056 $cm^{-1}$. Each laser of the laser array can have a programmable pulse duration from 20 ns to 500 ns.

In some exemplary embodiments, the excitation light has a wavelength in a range of 1000 nm to 2500 nm.

BRIEF DESCRIPTION OF THE DRAWINGS

FIGS. 3(a), 3(b), 3(c) illustrate MIRED spectroscopy of solvation dynamics on the microsecond scale.

FIGS. 4(a), 4(b), 4(c), 4(d), 4(e), 4(f) illustrate results of imaging biomolecules in fixed U87 cancer cells immersed in phosphate-buffered saline (PBS).

DETAILED DESCRIPTION

The present technology and disclosure are directed to mid-infrared energy deposition (MIRED) spectroscopy and microscopy that offers both microsecond-scale temporal resolution and sub-micron spatial resolution. In this approach, the photothermal process is optically probed while the infrared pulses from a quantum cascade laser array are rapidly tuned. Based on Newton's law of heating and cooling, the energy deposition is the first derivative of local temperature rise over time and gives the instantaneous absorption. By employing time-resolved measurement of transient energy deposition, the upper limit for spectrum encoding shifts to the vibrational relaxation level, which occurs on the picosecond scale. This approach significantly increases the detection bandwidth while retaining the sensitivity and resolution benefits of photothermal detection.

According to the current disclosure, by pump-probe measurement of absorption-induced change (temperature, size, refractive index, etc.) in a specimen, photothermal spectroscopy is an extremely sensitive analytical tool down to single molecule sensitivity. The initial development of photothermal spectroscopy in the 1970s detected weak overtone transitions in molecules. To enable chemical imaging of non-fluorescent species, various photothermal microscopy techniques have been developed in recent years. Visible photothermal microscopy developed in the 1990s enabled label-free imaging of single gold nanoparticles down to a few nanometers in diameter. In the early 2000s, the integration of atomic force microscopy (AFM) and infrared (IR) spectroscopy allowed nanoscale examination of molecules in thin, dried specimens. Recently developed mid-infrared photothermal (MIP) microscopy, also referred to as optically detected photothermal IR (OPTIR), have enabled submicron-resolution bond-selective imaging in aqueous environments. Further innovations include imaging at video-rate, breaking the visible diffraction limits, high-throughput camera-based widefield measurements, and volumetric imaging by optical photothermal tomography.

Despite the extremely high sensitivity and resolution offered by photothermal detection, achieving rapid spectral acquisition via photothermal spectroscopy has been considered a major obstacle. This limitation arises from the time needed for cooling during temperature modulation, which takes microseconds or longer. Consequently, even with an ultrafast wavelength-sweeping IR source and single pulse detection speed, the effective detection bandwidth is restricted to only hundreds of kilohertz per color.

Figure 1A:
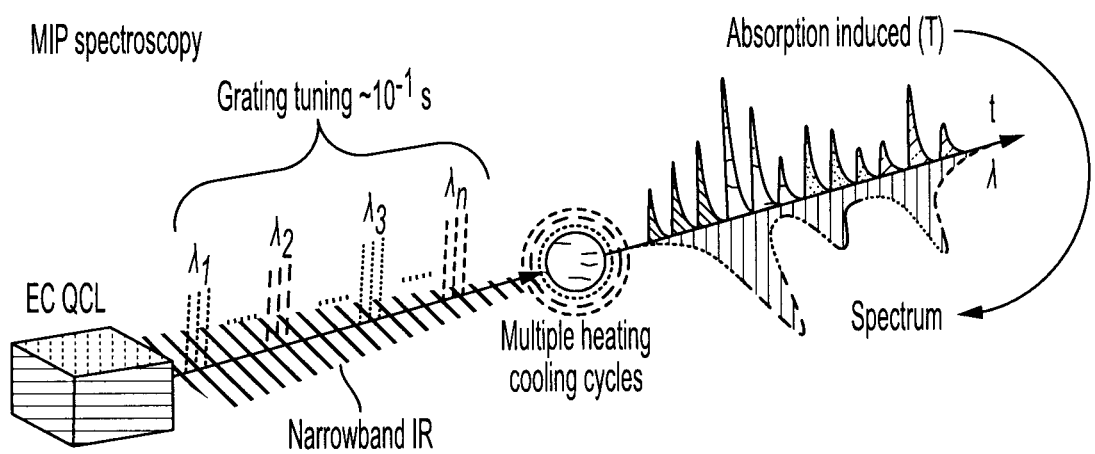
FIGS. 1(a) and 1(b) illustrate a comparison of MIP spectroscopy and MIRED spectroscopy of the current disclosure.
Figure 1B:
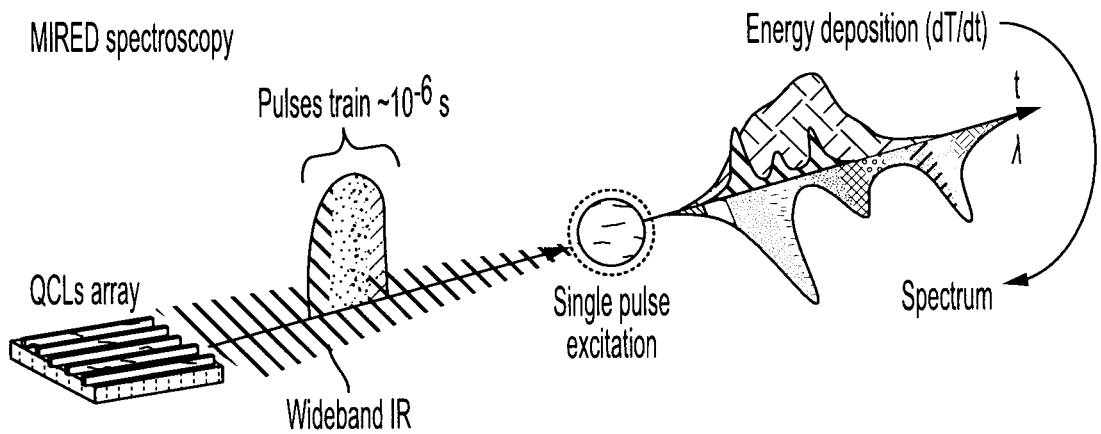

FIGS. 1(a) and 1(b) illustrate a comparison of MIP spectroscopy and MIRED spectroscopy of the current disclosure. FIG. 1(a) includes a schematic diagram illustrating MIP spectroscopy. FIG. 1(b) includes a schematic diagram illustrating MIRED spectroscopy, according to some exemplary embodiments. As illustrated in FIG. 1(a), the MIP signal is from a single-color excitation source. Measuring an absorption spectrum requires tuning IR wavelengths and involves multiple cycles of heating and cooling. As illustrated in FIG. 1(b) MIRED spectroscopy uses a broadband excitation source. By performing time-resolved energy deposition measurement in nanosecond scale, an absorption spectrum is obtained from the first derivative of local temperature rise.

As shown in FIG. 1(a), MIP spectroscopy uses a single-color IR source to excite a narrow band per measurement. Acquiring a spectrum requires continuously tuning the IR laser and inducing multiple cycles of photothermal modulation, with speeds typically around 0.1 seconds per 100 $cm^{-1}$ for a high-speed external cavity quantum cascade laser (EC-QCL). According to the current technology, this speed limitation is eliminated by revisiting the photothermal process from the perspective of energy deposition. According to Newton's law of heating and cooling, the local temperature T(t) of the absorber is the integration of heat flux during excitation, as shown in Equation (1).

$$C\frac{dT}{dt} = \dot{Q}_{abs} - \dot{Q}_{diffusion} \quad (1)$$

Here, C represents the heat capacity of the absorber, $\dot{Q}_{diffusion}$ denotes the heat dissipation term driven by the temperature difference between the absorber and its surroundings, and $\dot{Q}_{abs}$ corresponds to the energy deposited through absorption.

It can be observed that the absorption coefficient $\sigma(\lambda)$ exists in the slope of the heating process instead of the overall amplitude, as shown in Equation (2).

$$\dot{Q}_{abs} = I_{IR}(\lambda)\sigma(\lambda) \quad (2)$$

Thus, by employing time-resolved measurement of transient energy deposition, the upper limit for spectrum encoding shifts to the vibrational relaxation level, which occurs on the picosecond scale. This approach according to the current technology enhances the detection bandwidth while preserving the sensitivity advantages of photothermal detection.

Figure 6:
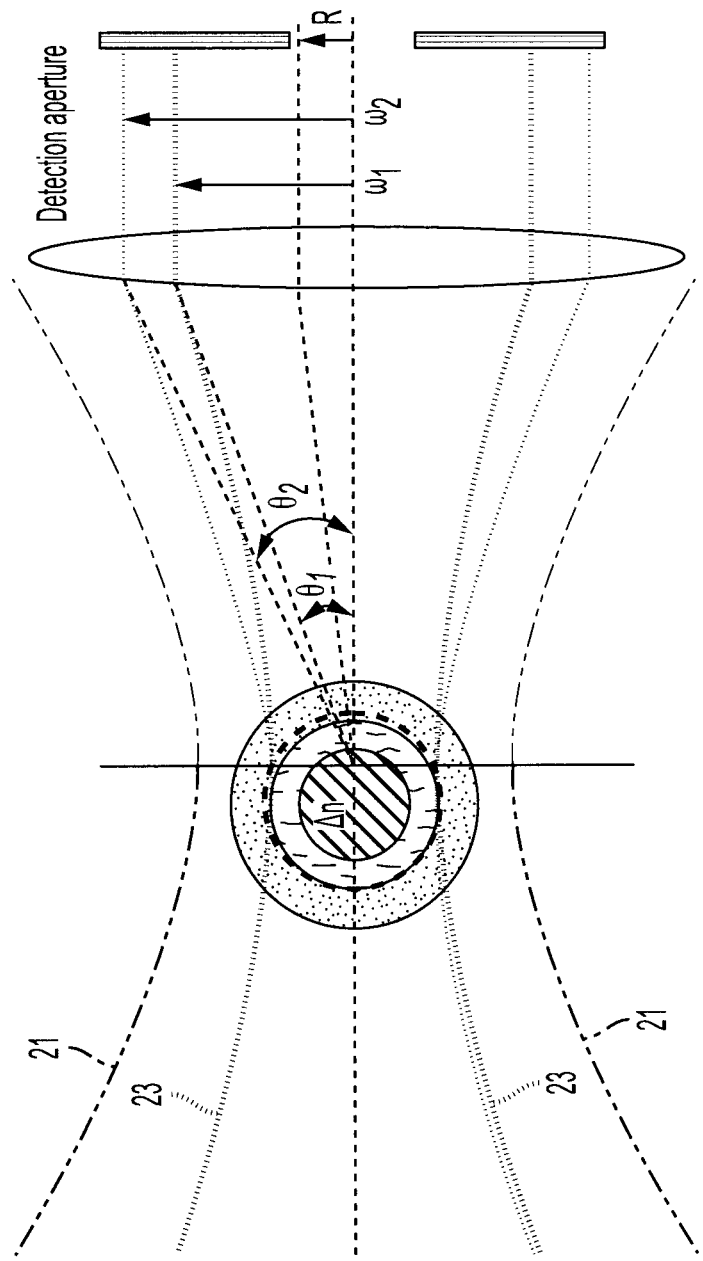
FIG. 6 includes a plot of penetration depth versus spatial resolution of vibrational imaging modalities.
Figure 7A:
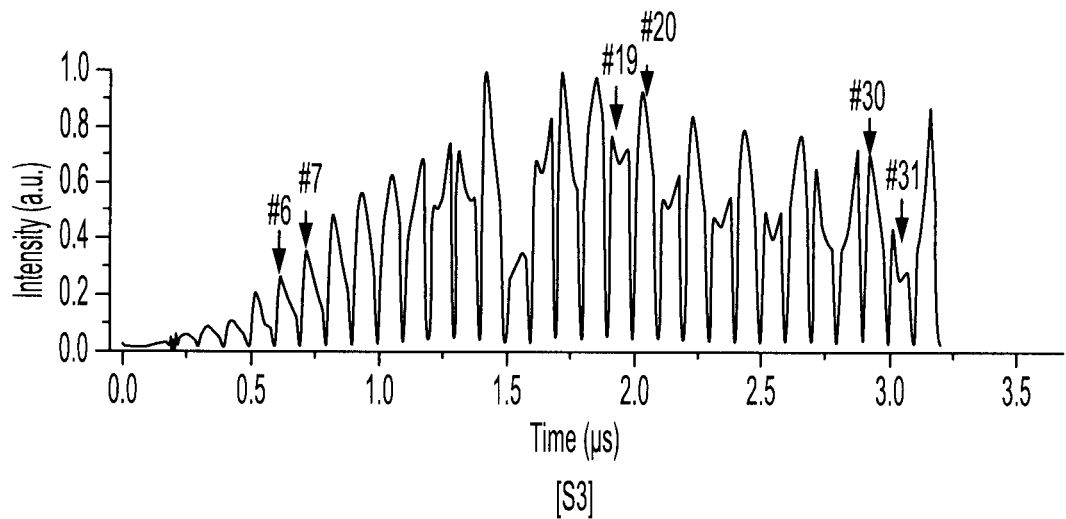
FIGS. 7(a), 7(b) illustrate characterization of QCL array emission in time and spectral domain.
Figure 7B:
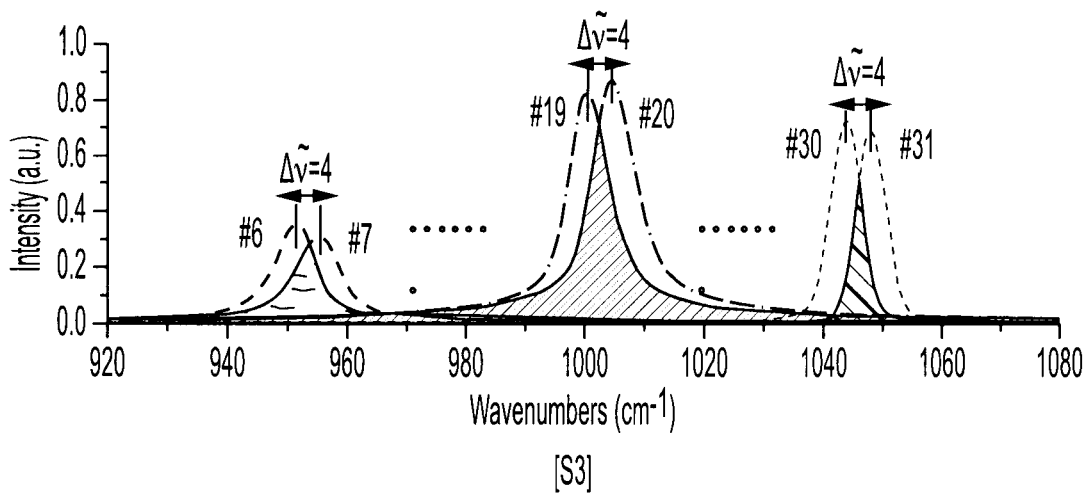

To demonstrate the technology of the current disclosure, mid-infrared energy deposition (MIRED) spectroscopy was developed utilizing broadband pulse train emissions from a beam-combined monolithic distributed-feedback (DFB) QCL array. The broadband IR source sequentially excites different molecular bands, as illustrated in FIG. 1(b). Time-resolved measurements are conducted during the excitation process, and the absorption spectrum is obtained from the transient energy deposition by calculating the time derivative of the heating curve. Spectrum acquisition is completed within the duration of the wideband pulse firing, which occurs on the microsecond scale. The theoretical framework of MIRED spectroscopy is described in the Additional Descriptive Material set forth hereinbelow, with the experimental setup illustrated in FIG. 5(a). The contrast mechanism utilized in this setup is illustrated in FIG. 6 and is described in the Additional Descriptive Material, Note 2. In summary, in some exemplary embodiments, the employed QCL array includes 32 independent lasers, spaced 4 cm$^{-1}$ apart, covering a range from 940 cm$^{-1}$ to 1056 cm$^{-1}$. Each laser emits a 100 ns-wide pulse, with all channels firing sequentially within 3.2 μs. The laser firing profile is illustrated in FIGS. 7(a) and 7(b), and the central wavenumbers along with their corresponding powers are listed in Table 1. The induced heating profile of the absorber is probed by a continuous-wave 532 nm laser. The probe is detected by a fast photodiode and digitized at 4 ns per point, providing the necessary temporal resolution to resolve the energy deposition from each individual laser pulse.

Figure 2A:
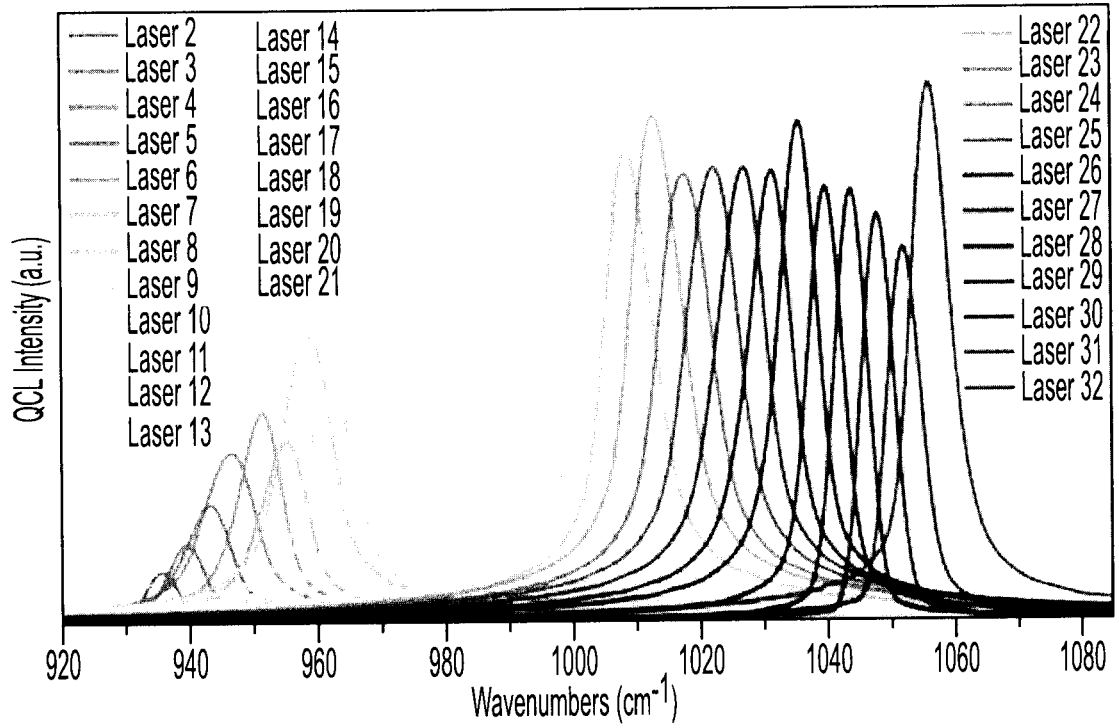
FIGS. 2(a), 2(b), 2(c), 2(d) illustrate results of generating MIRED spectra of three different chemicals.
Figure 2B:
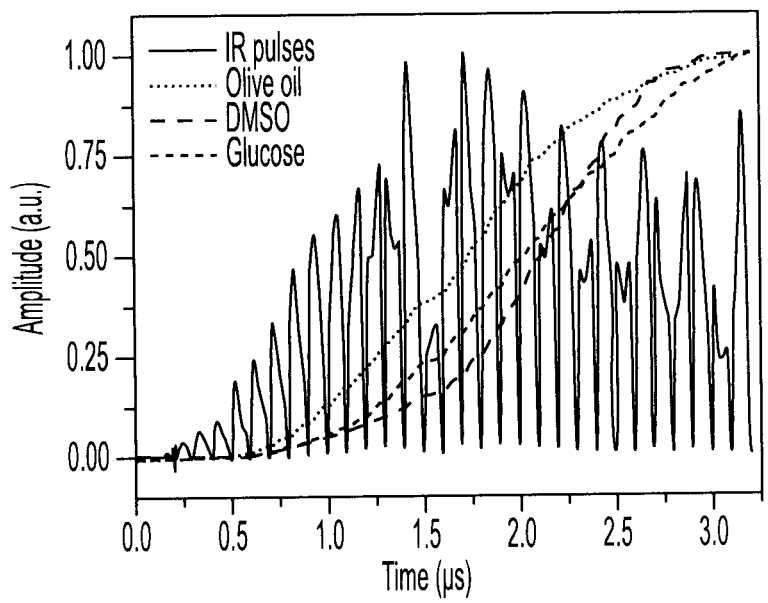
Figure 2C:
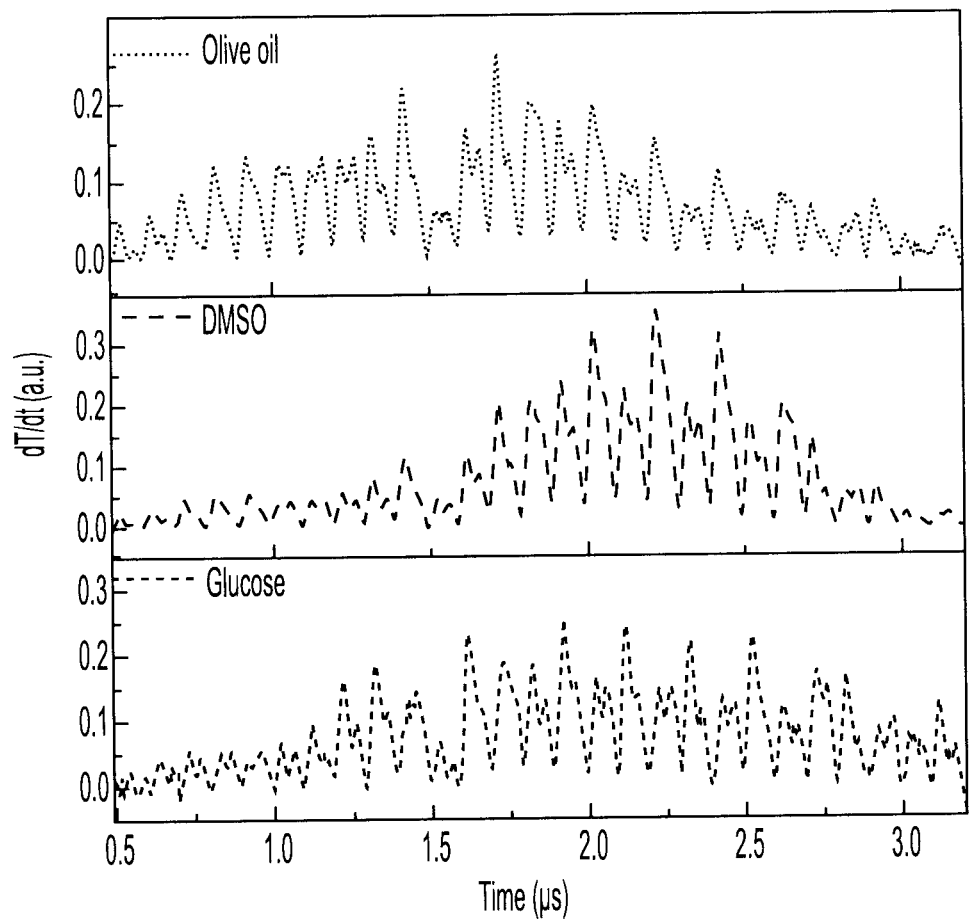
Figure 2D:
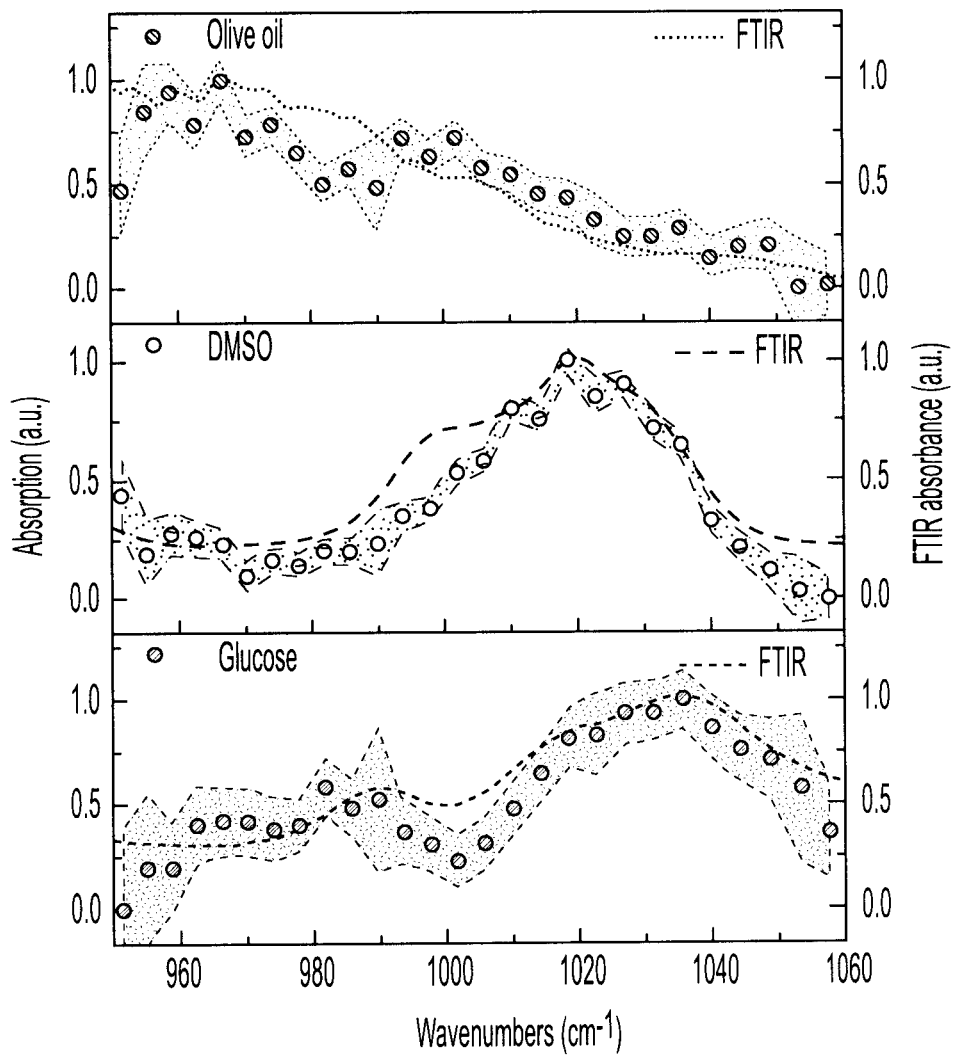

To validate the spectral fidelity, MIRED spectra of three different chemicals were measured, as illustrated in FIGS. 2(a), 2(b), 2(c), 2(d). Specifically, the three chemicals are olive oil, dimethyl sulfoxide (DMSO), and glucose solution. FIG. 2(a) illustrates the power spectrum of the QCL array. FIG. 2(b) illustrates the time-resolved heating curves under excitation, normalized to the same amplitude scale for comparison. Specifically, FIG. 2(b) illustrates the pulse train fired by the QCL array (gray) and the induced heating curves of olive oil (red), DMSO (orange), and glucose solution (blue). The energy deposition was then calculated by taking the time derivative of the heating curves, as shown in FIG. 2(c), which illustrates the time-resolved energy deposition. FIG. 2(d) illustrates the MIRED spectra after normalizing with IR energy. Twenty measurements are performed and averaging results are illustrated. This analysis reveals both the shape of each laser pulse and the relative absorption. Finally, the time-domain energy deposition data was converted into spectra, as illustrated in FIG. 2(d), which illustrates the data presented as the mean±standard deviations. The FTIR spectra are shown in solid line for comparison.

Figure 8:
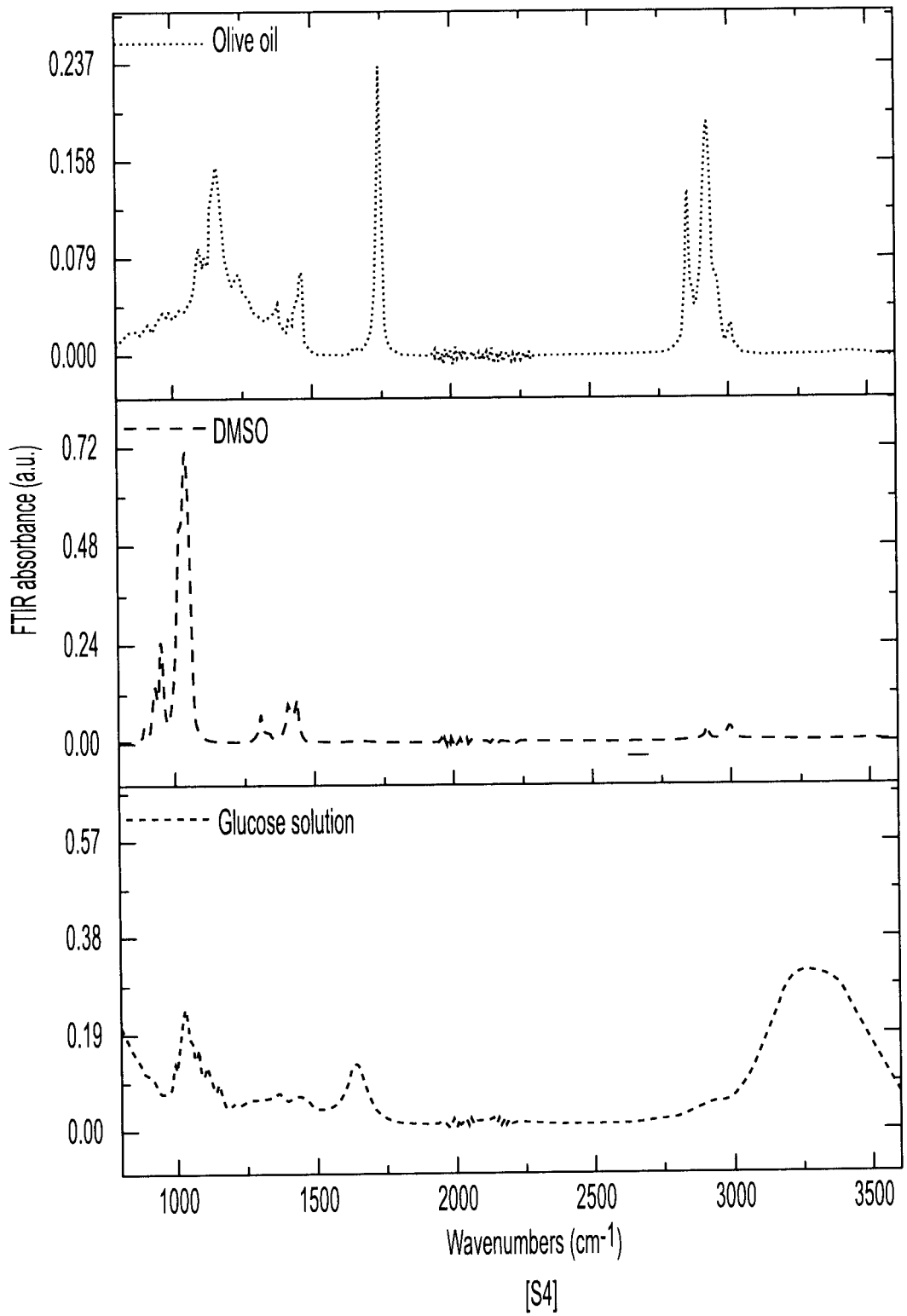
FIG. 8 illustrates Fourier-transform infrared (FTIR) spectra of olive oil, dimethyl sulfoxide (DMSO), and glucose solution at 200 mg/dL.

FIG. 8 illustrates Fourier-transform infrared (FTIR) spectra of olive oil, dimethyl sulfoxide (DMSO), and glucose solution at 200 mg/dL. Full spectra shown in FIG. 8 are provided for comparison, validating the MIRED results. In FIG. 8, the olive oil displays a peak at 966 cm$^{-1}$ from the —HC═CH— bending, dimethyl sulfoxide (DMSO) displays a strong absorption peak at 1022 cm$^{-1}$ from the S═O stretching, while the glucose solution with a concentration of 200 mg/dL shows a broader peak around 1035 cm$^{-1}$ from the C—O stretching. It is important to note that the heat flux measured by taking the derivative of the temperature includes contributions from both $\dot{Q}_{abs}$ and $\dot{Q}_{diffusion}$. For the sample measured above, the thermal diffusion rate is relatively slow compared to the excitation process. Consequently, $\dot{Q}_{diffusion}$ has a negligible impact on the MIRED spectra. This approximation is further described in the Additional Descriptive Material, Note 3. For objects with significantly faster heat diffusion rates, such as small particles, the MIRED approach of the disclosure remains applicable for retrieving spectral information by incorporating a correction term into the measurement, as described in the Additional Descriptive Material, Note 4.

Figure 3C:
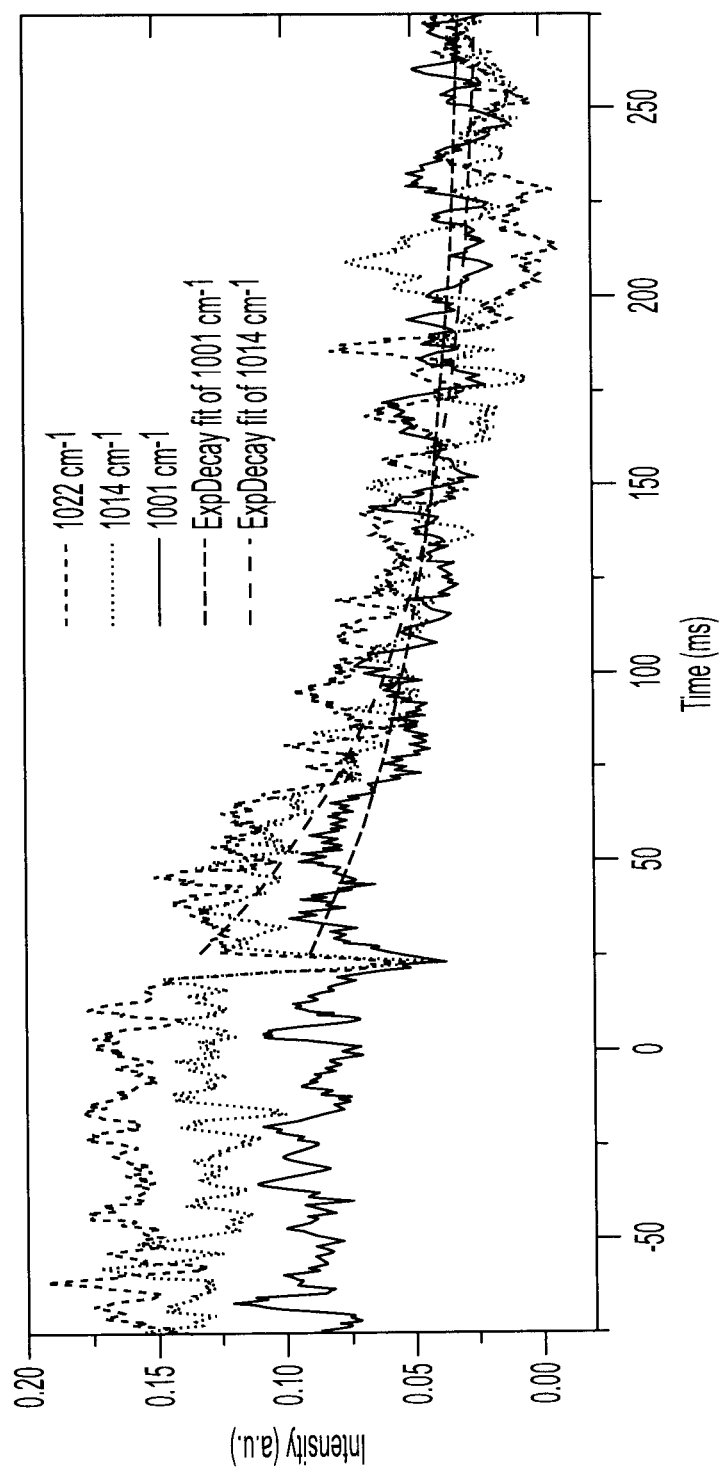

To demonstrate the microsecond-scale capabilities of MIRED spectroscopy, continuous spectral acquisition was conducted to observe the rapid mixing process of DMSO and water. FIGS. 3(a), 3(b), 3(c) illustrate MIRED spectroscopy of solvation dynamics on the microsecond scale. FIG. 3(a) illustrates a MIRED spectrum of DMSO-water binary mixture at different DMSO rations. FIG. 3(b) illustrates a MIRED intensity ration between two wavenumbers versus DMSO concentration. Fifty measurements were performed, and the averaged results are displayed. The data are displayed presented as the mean±standard deviation. FIG. 3(c) illustrates DMSO-water mixing dynamics revealed by single-pulse MIRED spectroscopy. Deionized (DI) water is added to 10 μL DMSO by pipette at t=0. The exponential decay is fit on intensity at 1014 cm$^{-1}$ and 1001 cm$^{-1}$. The time constants are 79 milliseconds and 103 milliseconds, respectively.

Figure 12:
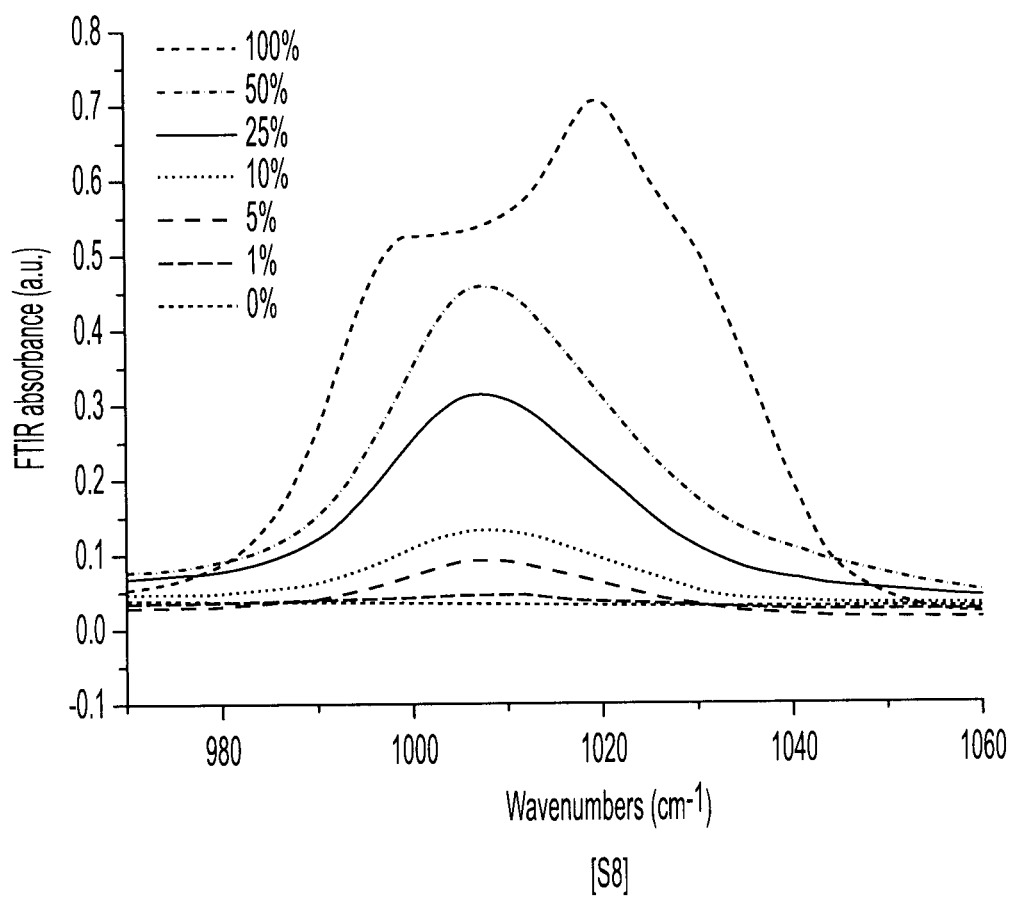
(FIG. 12 illustrates FTIR spectra of DMSO-water mixture at different DMSO ratios.

FIG. 12 illustrates FTIR spectra of DMSO-water mixture at different DMSO ratios. A redshift of the S═O bond is observed as the concentration of DMSO decreases. DMSO and water mixtures exhibit physical properties, such as dramatically changed freezing point and viscosity, attributed to the formation of molecular clusters through hydrogen-bond networks. Given the IR sensitivity to bond vibrations, MIRED spectroscopy according to the current disclosure can distinguish cluster states and their populations. Steady-state MIRED spectra of various concentrations of DMSO solution are shown in FIG. 3(a). By reducing the percentage of DMSO, a redshift of the peak from 1022 cm$^{-1}$ to 1001 cm$^{-1}$ and decreased absorption can be observed. Similar red shift is observed for FTIR measurement as shown in FIG. 12. This is explained by the decreased S═O dipole due to the formation of clusters while non-changed methyl group rocking. The change in intensity ratio versus DMSO concentration was quantified, as shown in FIG. 3(b). The curve represents the intensity ratio between the S═O peak at 1022 cm$^{-1}$ (blue), 1014 cm$^{-1}$ (red) and the shift peak at 1001 cm$^{-1}$. The ratio is approximately 1.4 at 100% DMSO concentration and decreases to below 1 when the DMSO concentration is less than 10%, indicating a change in bond dipole in addition to the reduction in analyte concentration. The molecular dynamics experiments begin with 100%

Figure 11:
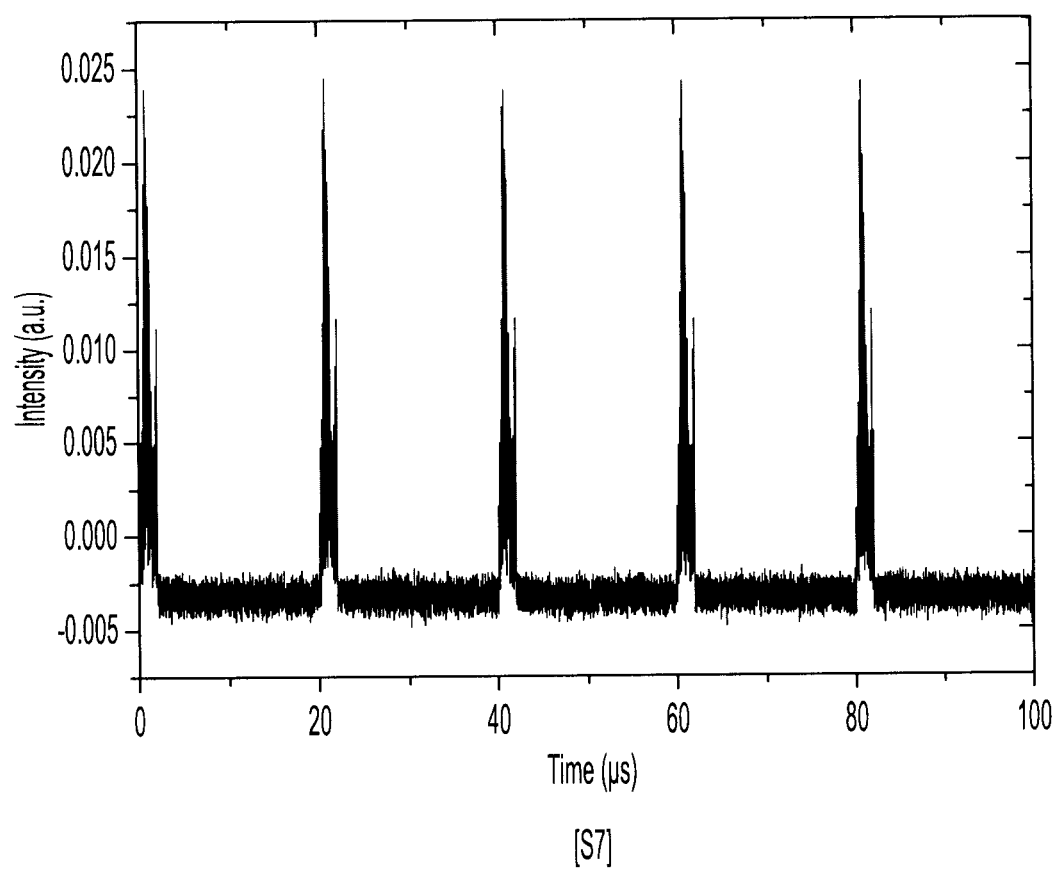
FIG. 11 is a curve illustrating continuous QCL array firing for high-speed spectroscopy and imaging.

DMSO, followed by the addition of excess water (20 times the volume of DMSO). The MIRED spectra are recorded continuously during the mixing process at a rate of 20 microseconds each, as shown in FIG. 3(c). The recording speed is determined by the QCL array repetition rate of 50 kHz, as illustrated in FIG. 11, which is a curve illustrating continuous QCL array firing for high-speed spectroscopy and imaging. The QCL array is continuously running with repetition rate at 50 kHz, providing an equivalent spectrum acquisition speed at 20 us each.

Time-resolved spectroscopy reveals the kinetics of molecular diffusion ($k_S$) and the rate of cluster population changes ($k_C$). These two processes are approximated using exponential population decay. The intensity at 1001 cm$^{-1}$, attributed to methyl rocking, is solely influenced by diffusion ($\tau_{1001}=k_S^{-1}$). Conversely, S=O absorption drop at 1014 cm$^{-1}$ is governed by both processes with a combined lifetime ($\tau_{1014}=(k_S+k_C)^{-1}$). By fitting the MIRED intensity at 1001 cm$^{-1}$ and 1014 cm$^{-1}$, the measured lifetimes are 103 milliseconds and 79 milliseconds, respectively. Consequently, the rate of water-DMSO cluster population change ($k_C$) is determined to be 2.95 s$^{-1}$, corresponding to a lifetime of 338 milliseconds. It is noted that MIRED captures dynamics on the microsecond to millisecond scale, unlike picosecond molecular dynamics studied with ultrafast spectroscopy, which focus on vibrational mode relaxations influenced by mixture ratios in static solutions. Instead, time-resolved MIRED provides a macroscopic view of population dynamics, especially in diffusion-limited systems transitioning toward equilibration in a new state.

Figure 4A:
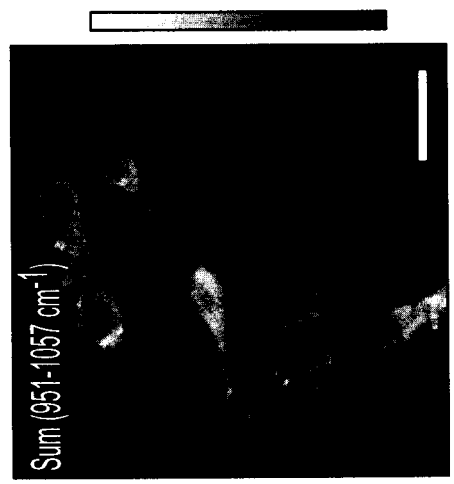
Figure 4B:
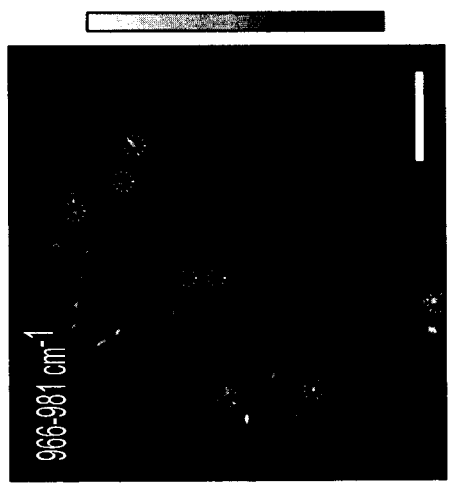
Figure 4C:
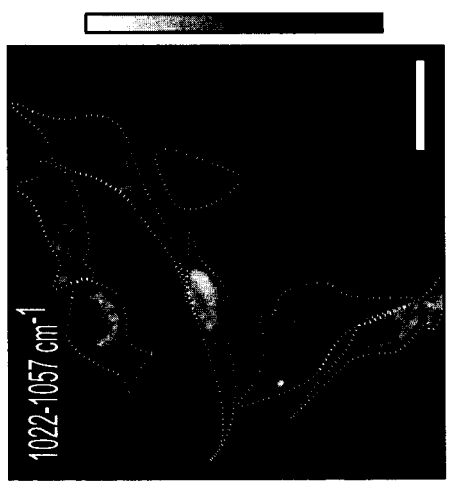
Figure 4D:
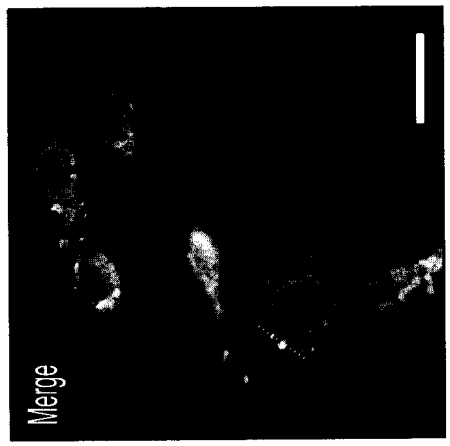

MIRED microscopy of the current disclosure is applicable to high-speed spectroscopic imaging with sub-micron resolution. According to the embodiments, biomolecules in fixed U87 cancer cells immersed in phosphate-buffered saline (PBS) were imaged, as illustrated in FIGS. 4(a), 4(b), 4(c), 4(d), 4(e), 4(f). FIG. 4(a) illustrates an average intensity from 951 cm$^{-1}$ to 1057 cm$^{-1}$. Referring to FIG. 4(b), at an average intensity from 966 cm$^{-1}$ to 981 cm$^{-1}$, the lipid droplets show strong absorption. Referring to FIG. 4(c), an average intensity from 1022 cm$^{-1}$ to 1057 cm$^{-1}$, the carbohydrate contributes to the absorption. FIG. 4(d) illustrates a merge image of lipid ester (magenta), and carbohydrate (green). FIG. 4(e) illustrates a line profile of the indicated area in the merge image of FIG. 4(d). FIG. 4(f) illustrates the MIRED spectra of lipid droplets and cell body. N=8, 6 accordingly for statistical analysis. The data are presented as the mean±standard deviations.

Figure 13A:
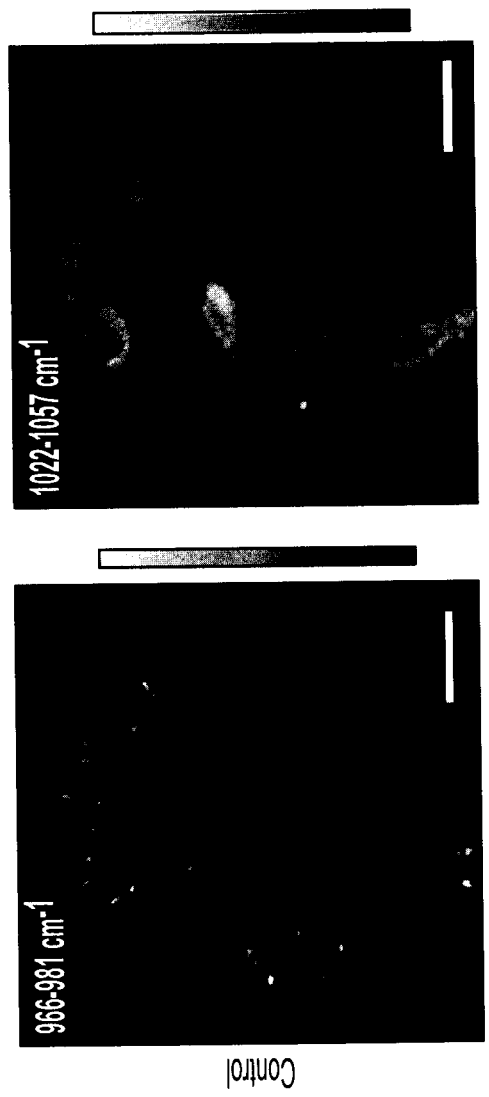
FIGS. 13(a), 13(b), 13(c), 13(d) illustrate MIRED spectroscopic imaging of U87 cancer cells in normal and delipid conditions.
Figure 13B:
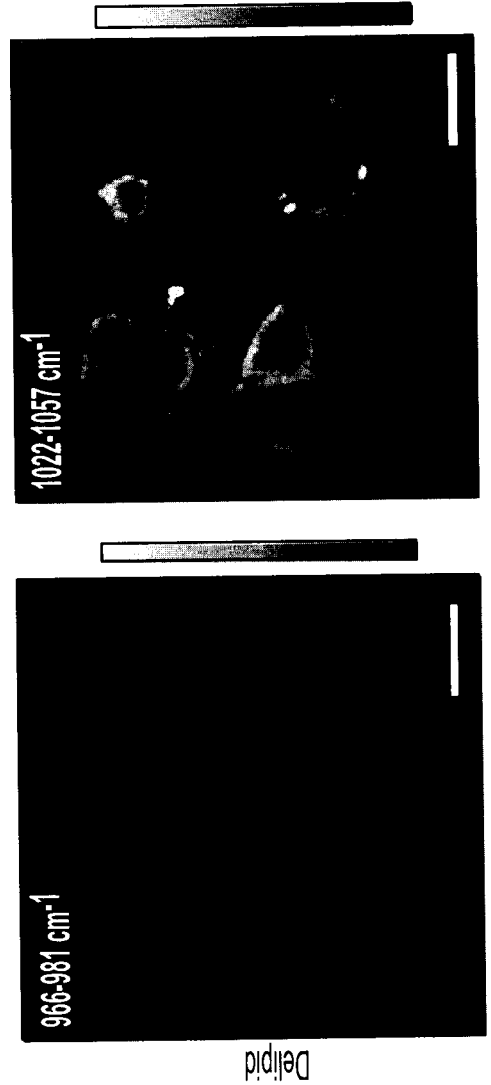
Figure 13D:
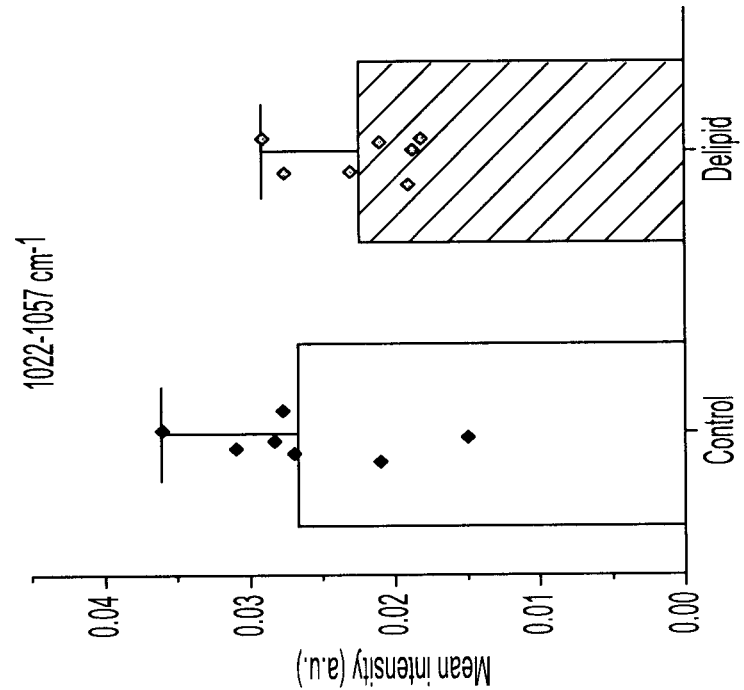
Figure 13C:
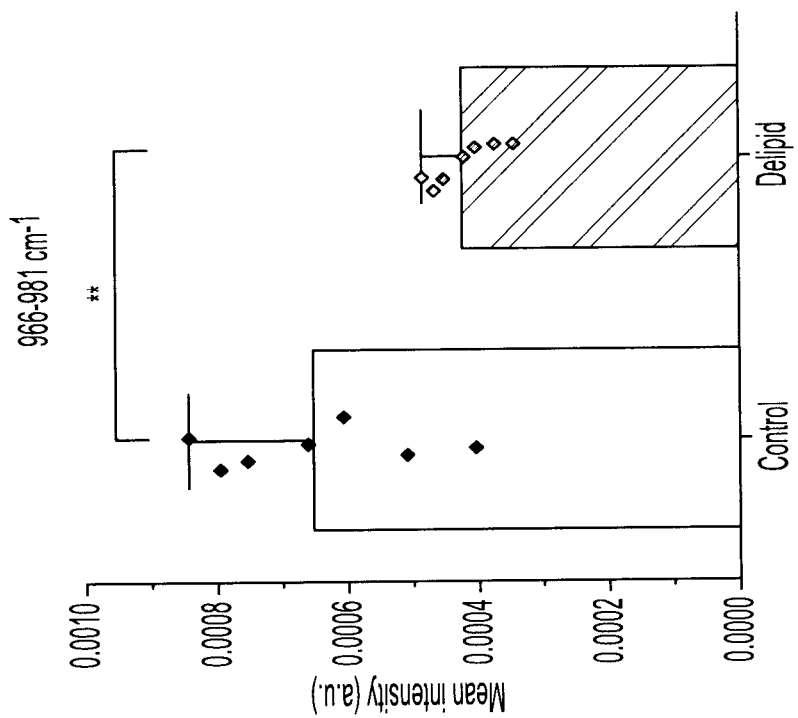

The MIRED spectra of the current disclosure can differentiate between fatty acid esters and carbohydrates. During imaging, a piezo stage raster scans the sample while MIRED spectroscopy continuously records data. Spectrum at each pixel is averaged by 10 times, resulting in an effective pixel dwell time of 200 μs. The overall intensity, representing the total absorption of the sample, is shown in FIG. 4(a). Specific absorption bands of the sample are evaluated, as shown in FIGS. 4(b) and 4(c). The merged image in FIG. 4(d) reveals the intracellular distribution difference between esters and carbohydrates. Aside from the diffuse carbohydrates spread throughout the cell body, a bright carbohydrates aggregate is observed. This aggregate is distinct from lipid droplets, as indicated by the dashed line in FIG. 4(e). These carbohydrate aggregates are likely glycogen in brain cancer cells. The average spectra of selected area indicated FIGS. 4(b) and 4(c) are shown in FIG. 4(f). FIGS. 13(a), 13(b), 13(c), 13(d) illustrate MIRED spectroscopic imaging of U87 cancer cells in normal and delipid conditions. FIG. 13(a) illustrates MIRED spectroscopic imaging of control group at fatty acid ester channel from 966-981 cm$^{-1}$ and carbohydrate channel from 1022 to 1057 cm$^{-1}$. FIG. 13(b) illustrates imaging results of delipid group in the same channels. Scale bars, 40 μm. FIGS. 13(c), 13(d) illustrate quantitative analysis of fatty acid ester and carbohydrate for U87 cultured in control, lipid depletion medium. n=7 to 9. **P<0.01.

The cancer cells cultured at delipidated (charcoal-striped) serum were measured, as shown in FIGS. 13(a), 13(b), 13(c), 13(d). Quantification analysis shows that the lipid depletion group had the dropped intensity in lipid channel from 966 cm$^{-1}$ to 981 cm$^{-1}$ compared with control group while there is no significant change on carbohydrate channel from 1022 cm$^{-1}$ to 1057 cm$^{-1}$, suggesting the accuracy of applying MIRED for mapping biomolecules. Additionally, single-color MIP imaging results obtained using an EC-QCL are provided for comparison in FIG. 14, confirming the carbohydrate peak observed in the MIRED experiment. It is worth noting that, although fixed cells were used in this approach, MIRED microscopy is suitable for live-cell research due to its low phototoxicity. Time-resolved fluorescence thermometry, as shown in FIGS. 15(a), 15(b), 15(c), 15(d), 15(e), 15(f) and described in the Additional Descriptive Material, Note 5, revealed a transient temperature increase of less than 16 K during microsecond-scale MIRED excitation.

Figure 16A:
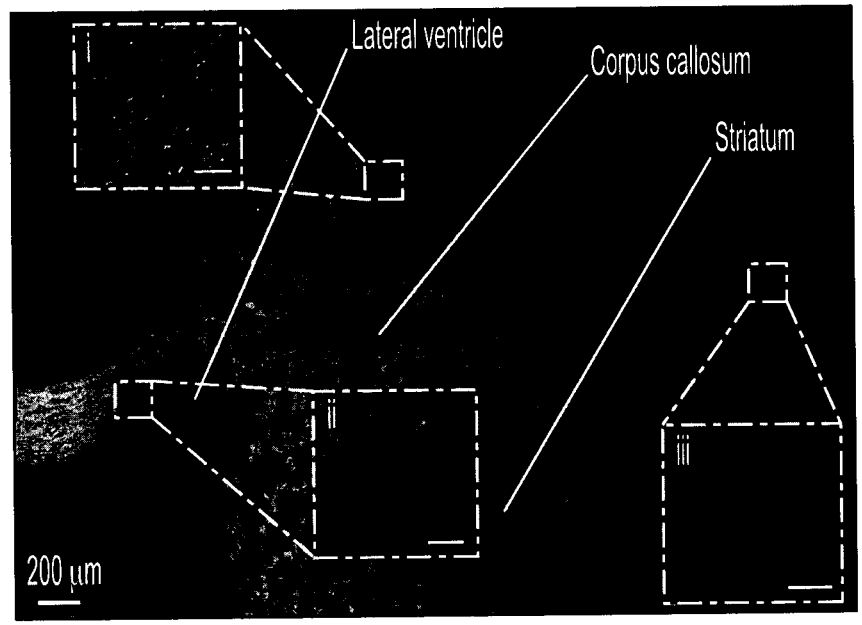
FIGS. 16(a), 16(b), 16(c), 16(d) illustrate millimeter-scale MIRED spectroscopic imaging of mouse brain section at submicron resolution.
Figure 16B:
Figure 16C:
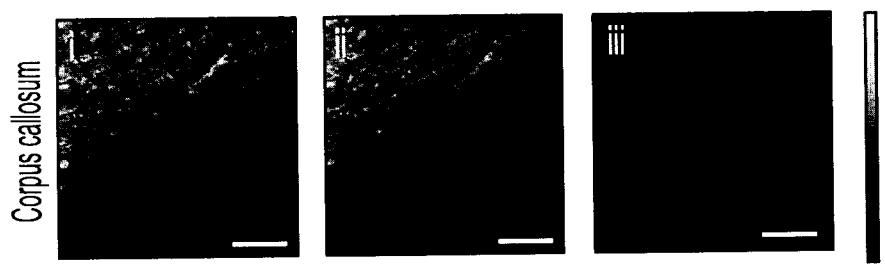
Figure 16D:
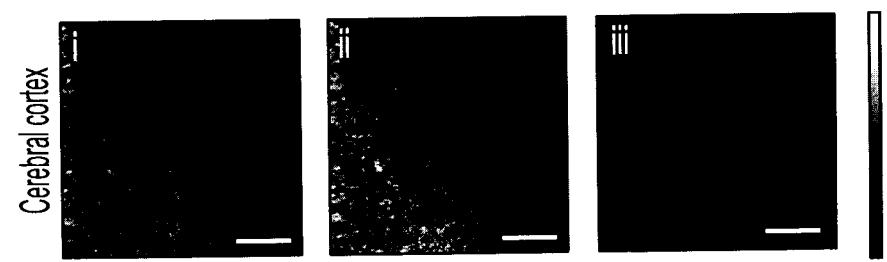

FIGS. 16(a), 16(b), 16(c), 16(d) illustrate millimeter-scale MIRED spectroscopic imaging of mouse brain section at submicron resolution. FIG. 16(a) illustrates hyperspectral MIRED image of mouse brain. Red: Lipid component. Blue: carbohydrate. Scales bar: 200 μm for whole image, 50 μm for insets. FIGS. 16(b)-16(d) illustrate zoom-in area of cerebral, corpus callosum and cerebral cortex at different wavenumbers accordingly. i: 980-1010 cm$^{-1}$, ii: 1018-1031 cm$^{-1}$, iii: 1035-1057 cm$^{-1}$. Scales bars: 50 μm. MIRED microscopy according to the current disclosure provides hyperspectral data with a single scan of the sample, significantly reducing the acquisition time for large tissue samples. Mouse brain spectroscopic imaging is demonstrated as shown in FIGS. 16(a), 16(b), 16(c), 16(d), with pseudo colors red, green, and blue representing the average absorption from windows of 980-1010 cm$^{-1}$, 1018-1031 cm$^{-1}$, and 1035-1057 cm$^{-1}$, respectively. Structures such as the cerebrum, corpus callosum, striatum, and are resolved based on their chemical composition differences. The cerebrum is uniformly enriched with carbohydrates where the fatty acid ester channel (980-1010 cm$^{-1}$) is darker than the carbohydrate channel (1035-1057 cm$^{-1}$), indicating a high population of neurons and high carbohydrate levels in the brain. The corpus callosum is primarily composed of fiber bundles, showing strong absorption similar to fat. In between, the cerebral cortex region demonstrates a transition between the fat signal in white matter (inside the brain) and the relatively high sugar signal in gray matter.

In recent years, vibrational spectroscopy has been advanced in two major directions: increasing the speed to detect molecular processes in highly dynamic environments and enhancing the sensitivity to visualize small amounts of substances in complex systems. MIRED-based vibrational spectroscopy and imaging methods described herein bridge these two directions. By measuring energy deposition via a pump-probe scheme, MIRED enables single-shot spectral acquisition on a microsecond time scale and imaging with submicron spatial resolution. This method opens a new way of using infrared spectroscopy to perform temporally and spatially resolved chemical analysis in various fields of material science and life science.

With reference to the photothermal process, the absorption coefficient can be accurately determined via time-resolved measurement of the heating slope. Given the vibrational relaxation time at the picosecond scale, fast spectral encoding and decoding can be implemented using a wideband infrared pulse and RF detection without cross-talk. In the current setup employing a QCL array, the spectrum range is limited by the number of excitation sources. This can be further improved by combining arrays covering different IR emission bands, such as 128 channels covering the entire fingerprint region. Other than QCL array, sources with ultrafast sweeping in nanoseconds-sale, such as mid-infrared frequency combs and time-stretched laser pulses can also be used for MIRED excitation for further speed improvement. Additionally, the concept of energy deposition detection could theoretically be extended to improve the throughput in other thermal-based spectroscopy methods, such as AFM-IR, which measures near-field thermal effects, fluorescence-detected photothermal microscopy for measuring fluorescently labeled organelles, and stimulated Raman photothermal microscopy by employing a fast delay line tuning scheme.

Notably, MIRED spectroscopy of the disclosure offers solution-phase molecular detection where most chemistry and biology occur. In such environments, conventional IR loss measurements require strictly controlled sample thickness and solvent attenuation to collect enough infrared photons on the detector. Using the pump-probe method, MIRED relaxes these conditions by measuring the transient effects occurring precisely at the absorption site. The extension of time-resolved vibrational spectroscopy in this domain would benefit biological research, aiding in the understanding of chemical reactions involved in cell metabolism and the conformation of biomolecules at the subcellular level. For example, the recently demonstrated use of molecular probes to sense enzymatic reactions via the nitrile group in the cell's silent window. This technique would enhance quantitative analysis and background correction by enabling the acquisition of the entire spectrum. Additionally, MIRED spectroscopy holds the potential for high-speed mid-infrared flow cytometry for screening cells for specific biomolecular markers, or study the kinetics of rapid reactions in solution.

It is noteworthy that the speed of vibrational spectroscopy is ultimately constrained by the number of measurable absorption events occurring upon excitation. MIRED spectroscopy inherently offers higher sensitivity in measuring these events for two main reasons. Firstly, it doesn't measure the intense excitation field, resulting in a relatively low background compared to direct photon loss measurement. Secondly, sensitivity is enhanced by eliminating the need for mid-infrared photon detectors, which typically suffer from thermal noise and low quantum efficiency at high bandwidth. Collectively, transient energy deposition measurement holds the potential for ultrafast vibrational spectroscopy in analysis, where both sensitivity and speed are important.

Additional Descriptive Material

Note 1: Theory of MIRED Spectroscopy

The energy deposition process during laser excitation can be derived from the Newton's law, with the presence of laser the temperature versus time can be expressed as:

$$C\frac{dT}{dt} = \dot{Q}_{abs} \quad (S1)$$

Here, C represents the heat capacity of the absorber, dT/dt is the temperature change over time, $\dot{Q}_{abs}$ is the rate of absorbed energy with units of watts.

The heating source $\dot{Q}_{abs}$ originates from light excitation, represented as $I(t)\sigma_{abs}$, where $I(t)$ is the excitation intensity function, and $\sigma_{abs}$ is the absorption cross-section of the sample. In the case of a QCL array with sequential pulses firing, $\sigma_{abs}$ varies with time due to the excitation of different chemical bands as the IR wavelength changes. Thus the $\dot{Q}_{abs}(t)$ becomes a piecewise function:

$$\dot{Q}_{abs}(t) = \begin{cases} I_{\lambda_1}(t)\sigma_{\lambda_1}, & 0 < t < \tau_{\lambda_1} \\ I_{\lambda_2}(t)\sigma_{\lambda_2}, & \tau_{\lambda_1} < t < \tau_{\lambda_2} \\ \vdots \\ I_{\lambda_n}(t)\sigma_{\lambda_n}, & \tau_{\lambda_{n-1}} < t < \tau_{\lambda_n} \end{cases} \quad (S2)$$

The integration of $\dot{Q}_{abs}(t)$ over the pulses train firing process yield the temperature rising curve $\Delta T(t)$. In time domain, $\Delta T(t)$ is related to photothermal intensity $I_{PT}$ with the thermo-optic coefficient $\beta$:

$$I_{PT}(t) \propto \beta \Delta T(t) \quad (S3)$$

As a result, the time-resolved energy deposition spectrum can be computed by taking the derivative of photothermal contrast over time:

$$\frac{dI_{PT}(t)}{dt} \propto \begin{cases} \frac{\beta}{C}I_{\lambda_1}(t)\sigma_{\lambda_1}, & 0 < t < \tau_{\lambda_1} \\ \frac{\beta}{C}I_{\lambda_2}(t)\sigma_{\lambda_2}, & \tau_{\lambda_1} < t < \tau_{\lambda_2} \\ \vdots \\ \frac{\beta}{C}I_{\lambda_n}(t)\sigma_{\lambda_n}, & \tau_{\lambda_{n-1}} < t < \tau_{\lambda_n} \end{cases} \quad (S4)$$

The absorption spectrum $\sigma_{abs}(\lambda)$ is subsequently derived from the energy deposition spectrum after normalizing with the IR excitation intensity.

Note 2: Contrast Mechanism of Optically Detected MIRED System

The MIRED spectroscopy and microscopy system of the current disclosure employs a co-propagation photothermal detection scheme, where the mid-infrared pump and visible probe beams are simultaneously focused to their diffraction limit on the sample using the same reflective objective lens. The detection is carried out in the forward direction. The temperature-induced probe intensity change is explained through the thermal lensing model, as illustrated in FIG. 6, which includes a schematic diagram of a model of an aperture-controlled photothermal detection system. The mid-infrared pump (dashed red) 21 and visible probe (solid green) 23 propagate from left to right. Mid-infrared excitation generates a temperature rise at the focal center, causing a change in the refractive index. This refractive index change alters the divergence of the probe beam from $\theta_1$ to $\theta_2$, which is detected as intensity modulation by setting the collection aperture size (R) smaller than probe beam waist at far-field $\omega_1$. The beam propagates from left to right, and upon infrared excitation, a transient temperature profile is generated at the focal point. This profile is the result of a convolution between the infrared intensity profile and the absorber shape (primarily the infrared profile in the case of pure solutions). As the focused probe beam propagates through the transient temperature profile, it is deflected due to heat-induced changes in the refractive index. This deflection is detected as an intensity change using an aperture-controlled system.

Before heating, the probe beam follows a Gaussian intensity distribution l(r), as shown in Equation (S5) with beam waist at $\omega_1$, and its divergence angle $\theta_1$, defined by the focusing objective lens. Where $I_0 = 2P_{probe}/\pi\omega_1^2$, based on the total probe power $P_{probe}$.

$$I(r) = I_0 \exp\left(-\frac{2r^2}{\omega_1^2}\right) \tag{S5}$$

Upon thermal-induced deflection, the divergence angle changes to $\theta_2$, resulting in a modified far-field distribution with a beam waist at $\omega_2$. Under approximation where the thermal lensing size is larger or comparable with probe focus, the beam waist difference ($\omega_2-\omega_1$) is proportional to ($\theta_2-\theta_1$), $\Delta n$ and consequently to $\Delta T$. The change in intensity distribution is measured as a variation in optical power using a controlled aperture with radius at R. The detected optical power P(R) as a function of the aperture R is expressed as:

$$P(R) = \int_0^R 2\pi r I(r) dr \tag{S6}$$

By substituting Equation (S5) into Equation (S6), the detected power is expressed as a function of the beam waist w and the detection aperture size R as shown in Equation (S7).

$$P(\omega, R) = P_{probe}\left[1 - \exp\left(-\frac{2R^2}{\omega^2}\right)\right] \tag{S7}$$

From the above description, it can be observed that the detected power P is a function of the beam divergence; as the beam waist $\omega$ increases, P decreases. Additionally, as the aperture size R increases, P becomes less sensitive to changes in $\omega$ (when R→∞, P=$P_{probe}$). In practice, R is set smaller than $\omega_1$ and optimized to collect sufficient photons to overcome shot noise.

Note 3: Thermal Diffusion Impact on MIRED Spectrum

As the MIRED process introduces the local temperature modulation, the heat diffusion impacts is considered. To model heat diffusion, it is assumed that heat conduction is the primary factor in the sample. The heat diffusion flux can then be approximated using Newton' law:

$$C\frac{dT}{dt} = \dot{Q} - \dot{Q}_{diffusion} \tag{S8}$$

$$\dot{Q}_{diffusion} = -h[T(t) - T_0] \tag{S9}$$

where h is the diffusion coefficient from the absorber to the environment. Under a constant energy deposition source $\dot{Q}_{abs}$, the temperature rising considering the heat diffusion can be expressed by:

$$T(t) = T_0 + \frac{\dot{Q}_{abs}}{h}\left(1 - e^{-\frac{h}{C}t}\right) \tag{S10}$$

To be noted here, Equation (S10) describes an exponential rising with a time constant $\tau_{diffusion}$ defined as:

$$\tau_{diffusion} = \frac{c}{h} \tag{S11}$$

The heat diffusion impact on energy deposition measurement can be analyzed through Taylor expansion on Equation (S10):

$$T(t) \approx T_0 + \frac{\dot{Q}_{abs}}{c}\left(t - \frac{h}{2C}t^2 + \frac{h^2}{6(C)^2}t^3 + \ldots\right) \tag{S12}$$

where one can observe that the diffusion coefficient only shows up in high-order terms. Plugging Equation (S11) into Equation (S12):

$$T(t) \approx T_0 + \frac{\dot{Q}_{abs}}{C}t\left(1 - \frac{t}{2\tau_{diffusion}} + \frac{t^2}{6\tau_{diffusion}^2} + \ldots\right) \tag{S13}$$

The high-order terms become negligible as $t/\tau_{diffusion}$ is small. This yields the thermal confinement condition for measuring the energy deposition accurately, where the heating pulse duration or detection period t needed to be smaller than thermal diffusion time $\tau_{diffusion}$.

In the current MIRED experiments, t is set to 100 ns for each channel, which is significantly shorter than the sample's thermal decay time, which ranges from a few to tens of microseconds. Consequently, the energy deposition can be approximated by the first-order term:

$$T(t) - T_0 \approx \frac{\dot{Q}_{abs}}{c}t \tag{S14}$$

Figure 9A:
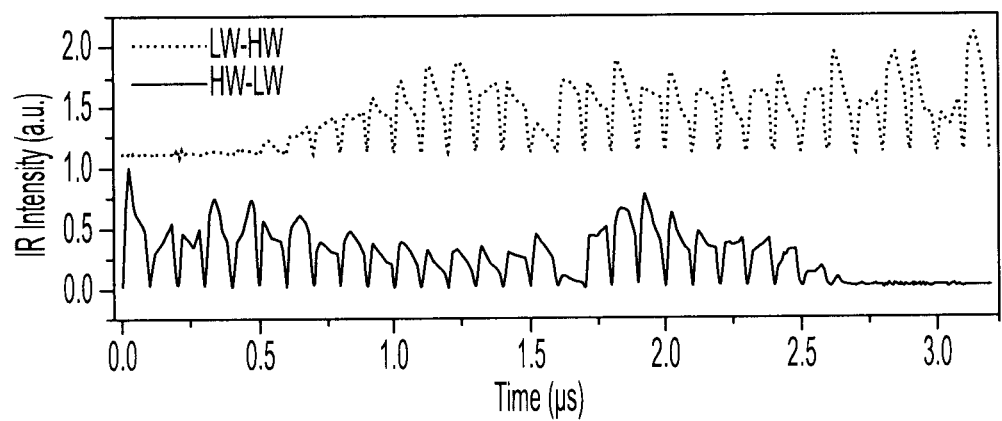
FIGS. 9(a), 9(b), 9(c), 9(d) illustrate characterization of thermal diffusion effect on the MIRED spectrum.
Figure 9B:
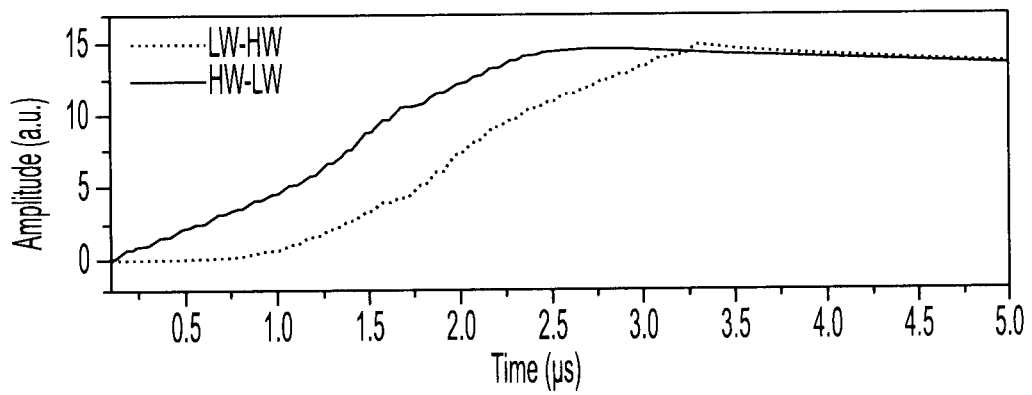
Figure 9C:
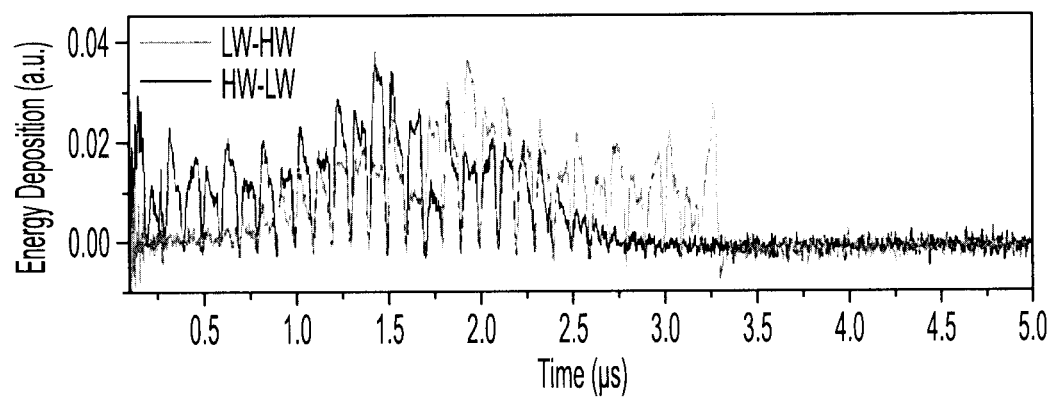
Figure 9D:
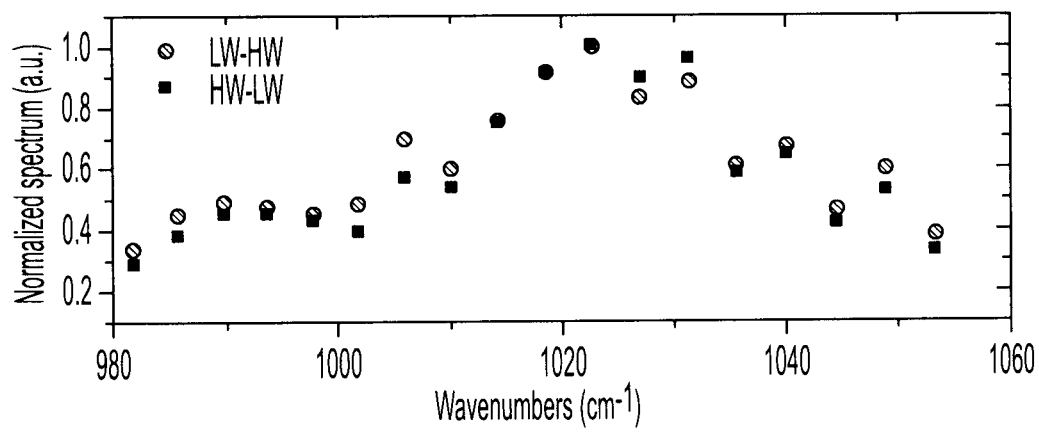

To validate the negligible impact of thermal diffusion on MIRED experiments, MIRED spectroscopy of the current disclosure was performed on a pure DMSO sample by varying the laser excitation sequence. The results are shown in FIGS. 9(a), 9(b), 9(c), 9(d), which illustrate characterization of thermal diffusion effect on the MIRED spectrum. Two types of QCL pulse sequences were employed, from low wavenumbers to high wavenumbers (LW-HW) and from high wavenumbers to low wavenumbers (HW-LW), as illustrated in FIG. 9(a). As noted, referring to FIG. 9(a), the DMSO sample is excited by pulse trains fired in two different ways: from low wavenumbers to high wavenumbers (LW-HW) and the reverse (HW-LW). The corresponding induced heating curves under the two excitation schemes in FIG. 9(a) are illustrated in FIG. 9(b). Results resolved from the curves of FIG. 9(b) are illustrated in FIG. 9(c). The resolved MIRED spectra of DMSO with the two different excitation schemes are illustrated in FIG. 9(d). The computed energy deposition is shown in FIG. 9(c), and the resolved spectrum is shown in FIG. 9(d). Under these two different excitation schemes, the MIRED spectra yield similar results for the DMSO S=O peak at 1022 cm$^{-1}$, indicating that the impact of thermal diffusion is negligible under the current MIRED experimental conditions.

Note 4: Extension of MIRED Detection for Fast Thermal Diffusion Object

According to Newton's law of heating and cooling, as shown in Equations (S8) and (S9), the heat dissipation term ($\dot{Q}_{diffusion}$) is driven by the temperature difference and becomes significant when the local temperature is high, eventually approaching the heating term ($\dot{Q}_{abs}$). A heating plateau is reached when $\dot{Q}_{diffusion}$ equals $\dot{Q}_{abs}$. For fast-diffusion objects, this plateau occurs earlier than for slow-diffusion objects, leading to a nonlinear heating process. In such cases, the assumption of a linear relationship between temperature rise and energy deposition no longer holds, and the derivative of the temperature rise cannot directly represent absorption. This issue becomes particularly pronounced when the excitation pulse width is much longer than the heat confinement time. However, we note that MIRED spectroscopic detection can still recover spectral information by incorporating a correction term. The measured photothermal intensity reflects the local temperature rise, which is proportional to the amplitude of the dissipation term, as described in Equation (S15).

$$I_{PT}(t) \propto \Delta T(t) \propto \dot{Q}_{diffusion} \qquad (S15)$$

For a specific wavelength excitation, the measured energy deposition signal is expressed in Equation (S16) in the form of Newton's law, characterized by two parameters A, B.

$$\frac{dI_{PT}(t)}{dt} = A * I_{\lambda_n}(t) \sigma_{\lambda_n} - B * I_{PT}(t) \qquad (S16)$$

Parameters A and B are intrinsic properties of the sample that remain constant during wavelength sweeping. In a single MIRED measurement, parameter B is used to account for the dissipation effect on the absorption spectrum readings. This parameter can be readily measured after the excitation ends, as the local temperature decreases, as described in Equation (S17).

$$\frac{dI_{PT}(t)}{dt} = -B * I_{PT}(t) \qquad (S17)$$

As a result, the absorption spectrum information is obtained by calculating Equation (S18). This measurement accounts for heat diffusion, ensuring accurate energy deposition analysis and providing undistorted absorption spectrum information.

$$\sigma_{\lambda_n} = \left[\frac{dI_{PT}(t)}{dt} + B * I_{PT}(t)\right] / [A * I_{\lambda_n}(t)] \qquad (S18)$$

Figure 10A:
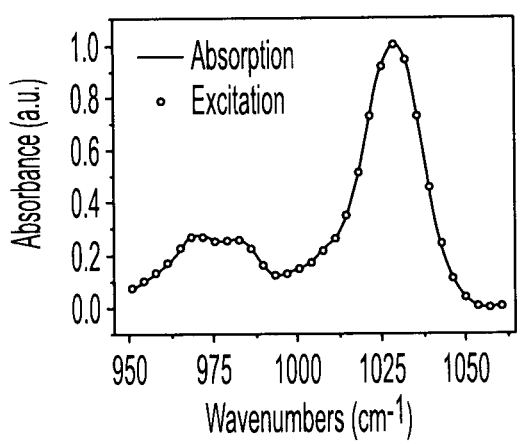
FIGS. 10(a), 10(b), 10(c), 10(d), 10(e), 10(f) illustrate simulation of transient heating and energy deposition measurements considering heat diffusion.
Figure 10B:
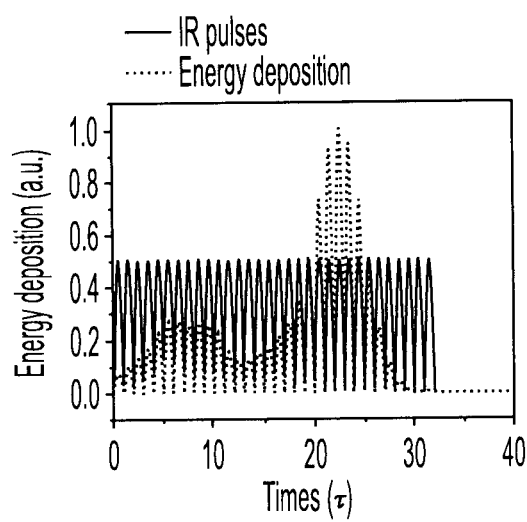
Figure 10C:
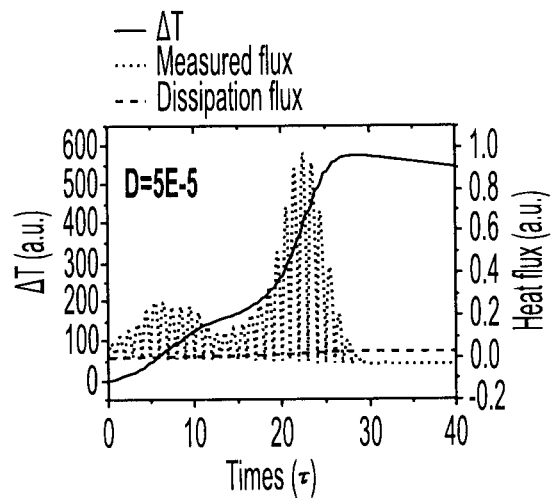
Figure 10D:
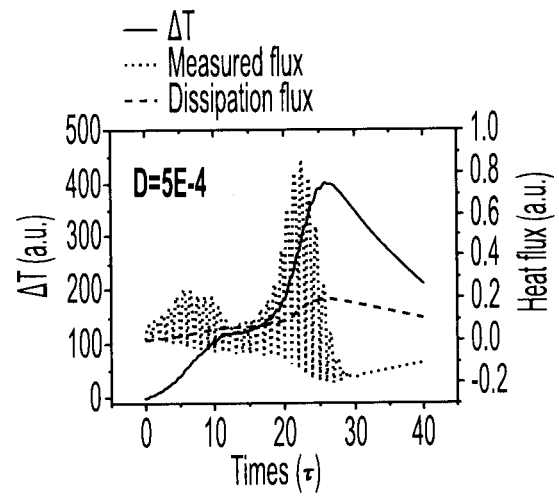
Figure 10E:
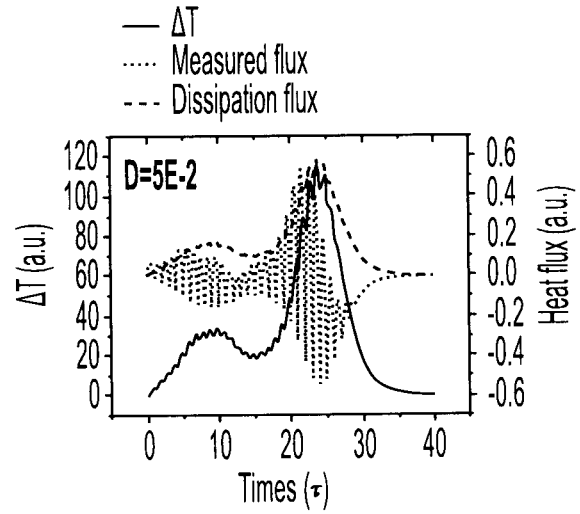
Figure 10F:
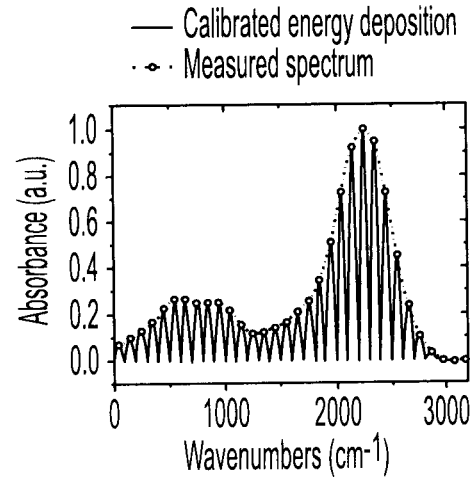

Now described are time-dependent simulations of absorbers with varying heat dissipation speeds to validate the new formulation of energy deposition spectroscopy measurements. FIGS. 10(a), 10(b), 10(c), 10(d), 10(e), 10(f) illustrate simulation of transient heating and energy deposition measurements considering heat diffusion. FIG. 10(a) illustrates simulated absorption spectrum with dots indicating the laser excitation wavenumbers. FIG. 10(b) illustrates time-resolved energy deposition resulting from sequential excitation with 32 pulses. FIGS. 10(c) 10(e) illustrate the simulated heating process with same $\dot{Q}_{abs}$ but varying heat dissipation coefficients D. FIG. 10(f) illustrates that corrected spectrum measurements produce consistent results across different dissipation levels. At first, the IR absorption spectrum is simulated, as shown in FIG. 10(a). The MIRED excitations are conducted sequentially across 32 evenly spaced channels within the spectral window, represented by dots. Each individual excitation pulse is configured to have a Gaussian shape with uniform intensity across all channels. The corresponding energy deposition $\dot{Q}_{abs}$ is depicted in FIG. 10(b) as a curve over the level curve illustrating IP pulses, where the X-axis is expressed in units of t, corresponding to the duration of single-color heating pulse.

Using the simulated energy deposition $\dot{Q}_{abs}$, we calculate the transient temperature in arbitrary units based on Equation (S19), where D represents the heat dissipation coefficient. dT(t)/dt represents the measured heat flux, DT(t) represents the dissipation flux.

$$\frac{dT(t)}{dt} = \dot{Q}_{abs} - DT(t) \qquad (S19)$$

The calculated transient temperatures for various D values are shown in FIGS. 10c(c)-10(e), with D ranging from $5 \times 10^{-5}$ to $5 \times 10^{-2}$, representing objects with slow to fast heat diffusion properties. For slow diffusion objects, the measured energy flux (magenta curve) closely matches the energy deposition, as the dissipation flux (blue curve) is minimal. However, as heat dissipation becomes significant, the measured flux deviates from the actual energy deposition, as shown in FIGS. 10(d) and 10(e). By incorporating the dissipation term into the energy deposition calculation (energy deposition=measured flux+dissipation flux), accurate energy deposition together with absorption spectrum can be recovered under all conditions, as shown in FIG. 10(f).

Figure 14:
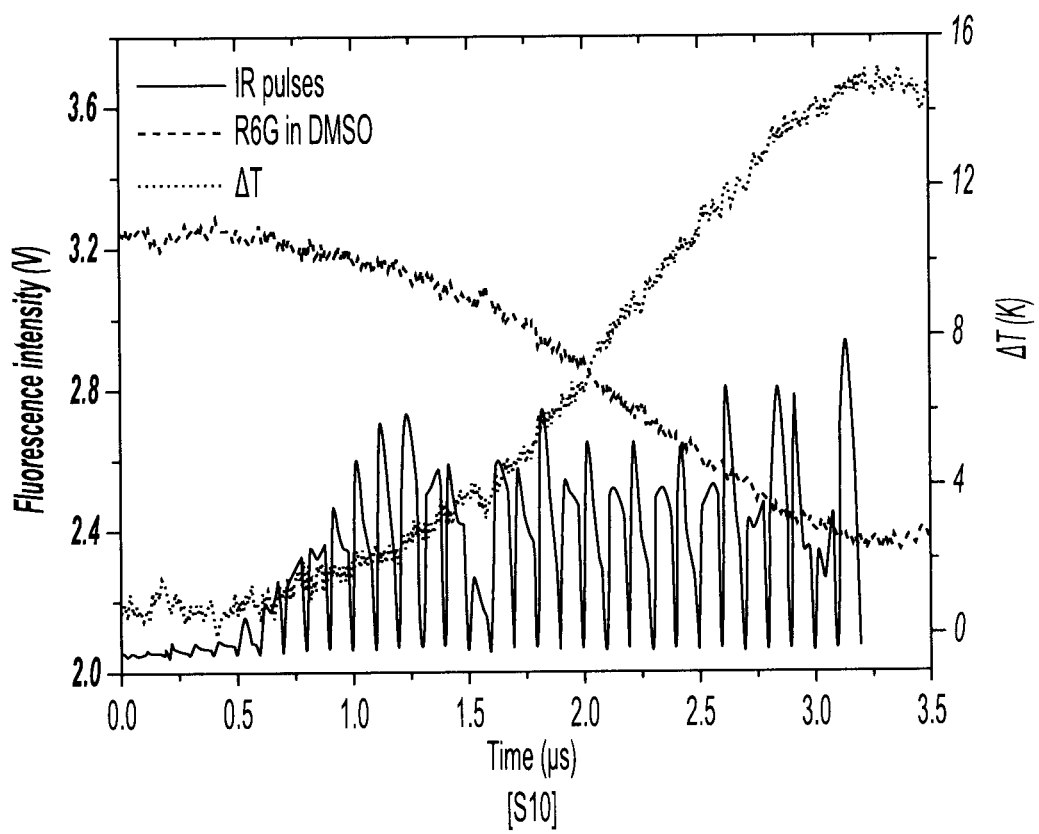
FIG. 14 illustrates temperature rise in DMSO induced by pulse train excitation.

Note 5: Measurement of Temperature Rise in MIRED Process Using Time-Resolved Fluorescence Thermometry Now described is the impact of phototoxicity on the application of the spectroscopy and microscopy methods of the current disclosure to live-system imaging. The primary source of phototoxicity in a mid-IR pumped system arises from thermally induced stress on living cells. To address this, time-resolved fluorescent thermometry was performed to measure the actual temperature during individual MIRED excitation. Specifically, Rhodamine 6G (R6G) fluorescence intensity changes caused by pulse train excitation on DMSO were used. The temperature rise based on the known R6G temperature sensitivity of 1.9%/K was calculated. FIG. 14 illustrates temperature rise in DMSO induced by pulse train excitation. The real-time temperature increase is measured using time-resolved fluorescence thermometry. Rhodamine 6G (R6G) at a concentration of 50 µM is dissolved in DMSO, with its temperature sensitivity calibrated at 1.9%/K. The results, shown in FIG. 14, indicate a peak temperature rise of 15.6 K, which lasts for less than 1 microsecond. Given the strong absorption of DMSO, it is estimated that the local temperature rise under cell imaging conditions would be similar or lower. This transient heating of 15.6 Kelvin is considered to induce minimal phototoxicity, especially under imaging conditions where the total excitation times at each spatial point is less than 10.

Figure 5A:
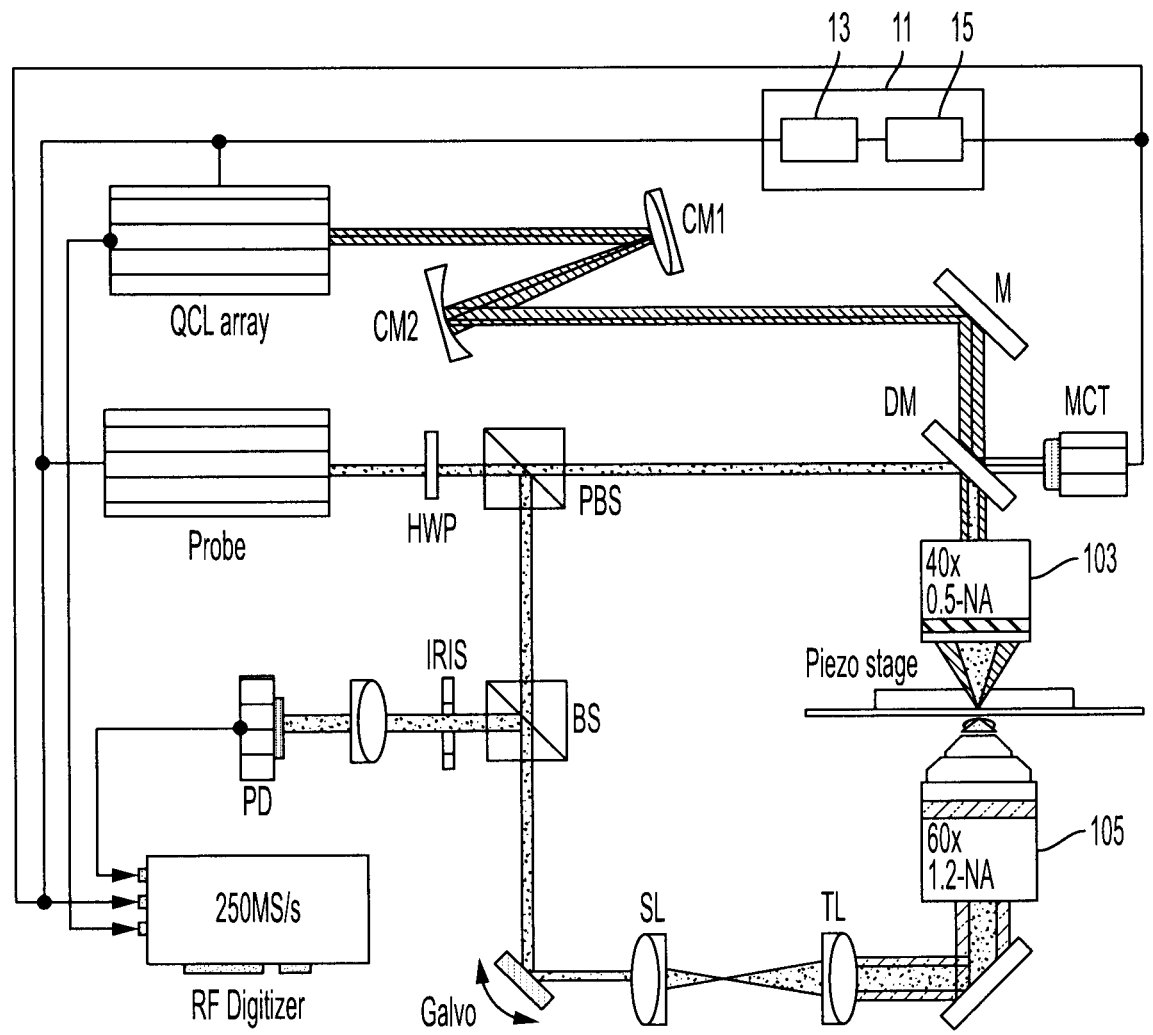
FIGS. 5(a), 5(b), 5(c), 5(d) schematically illustrate the quantum cascade laser (QCL)-array based MIRED spectroscopy, microscopy and signal processing system of the current disclosure, according to some exemplary embodiments.
Figure 5B:
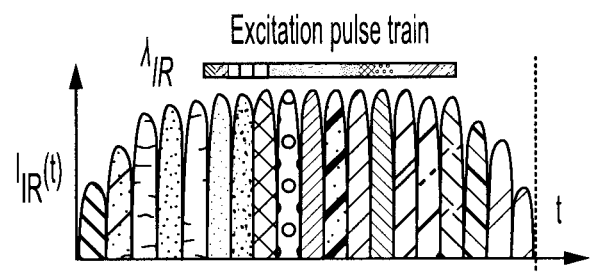
Figure 5C:
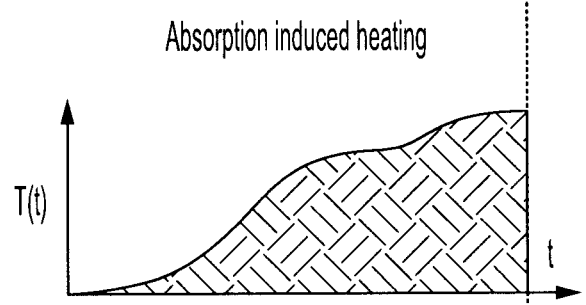
Figure 5D:
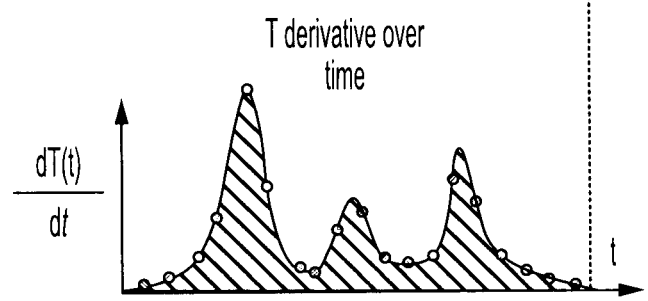

FIGS. 5(a), 5(b), 5(c), 5(d) schematically illustrate the quantum cascade laser (QCL)-array based MIRED spectroscopy, microscopy and signal processing system of the current disclosure. FIG. 5(a) is a schematic functional block diagram which illustrates the MIRED system, according to some exemplary embodiments. The system includes a convex mirror CM1, a concave mirror CM2; a dichroic mirror DM; Mercury-Cadmium-Telluride (MCT) HgCdTe mid-infrared detector, tube lens TL, scan lens SL, 50/50 beam splitter BS; polarized beam splitter PBS, half wave plate HWP, and silicon photodiode PD. FIG. 5(b) illustrates QCL array excitation pulses train. FIG. 5(c) Illustrates a time-resolved heating curve measured by the photodiode PD and recorded by the RF digitizer. FIG. 5(d) illustrates transient energy deposition by taking the derivative of heating over time.

1. MIRED Spectroscopy and Microscopy

Referring to FIG. 5(a), the QCL array, of the type provided by Pendar Technology LLC, for example, is used as a pump source, which has 32 channels covering the fingerprint region from 940 cm$^{-1}$ to 1056 cm$^{-1}$. Each laser has a programmable pulse duration from 20 ns to 500 ns with a maximum duty cycle less than 5%. The wavelength of each pulse is equally separated with 4 cm$^{-1}$ corresponding to the spectrum resolution of the acquired spectrum. The pump beam is focused on the sample, positioned on the piezo stage, with a reflective objective 103 with 0.5 NA (LMM-40X-P01, Thorlabs, for example). The reflective objective 103 eliminates the chromatic aberration at different wavelengths and guarantees the uniform excitation intensity on the sample during sequential QCL emission. The probe source is provided by a continuous-wave laser at a wavelength of 532 nm (of the type provided by, for example, Samba, Cobolt). The visible probe light is focused on the sample in two ways. For high-resolution imaging experiments, a water immersion objective lens 105 with 1.2 numeric aperture (UPLSAPO60XW, Olympus) is used providing a lateral spatial resolution of 230 nm. For liquid spectroscopy and tissue imaging experiments, the same 0.5 NA reflective objective lens 103 used for pump beam focusing is applied in a co-propagation geometry. The piezo sample stage (Bio-200, Mad city lab, for example) is used for point scan imaging. The modulation signal carried by probe light is detected from forward or backward scattering by using reverse-biased silicon photodiodes PD (DET100A, Thorlabs, for example). Intensity modulation is amplified by a wide-band amplifier (SA230-F5, NF corporation, for example) with a gain of 46 dB. The signal filtered with anti-aliasing filtering at 50 MHz (BLP-50+, Minicircuits, for example) is directly digitized at, for example, 250 million samples per second with a data acquisition card RF Digitizer (EON express, Gage applied, for example), providing effective temporal resolution at 4 nanoseconds. The excitation pulses train is monitored by a Mercury-Cadmium-Telluride (MCT) detector with 10 MHz bandwidth (VIGO system, for example) and acquired by the same digitizer used for trigger source and power normalization. Processing system or processor 11 carries out the processing and control used to effect the MIRED spectroscopy and microscopy approach of the current disclosure. Processing system or processor 11 can include processing circuitry 13 and associated elements 15 such as memory, input/output facilities, interface facilities, etc. used to implement the current technology. Processing system or processor 11 receives the signal indicative of the selective heating of the sample, computes a time rate of local temperature rise in the sample to obtain instantaneous absorption in the sample, and, using the instantaneous absorption, generates a spectrum related to the sample and/or an image of the sample. Processing system or processor 11 can include, for example, a general purpose computer, a microprocessor system, a microcontroller system, or any processing system used to process data and provide control and input/output and user interface capability associated with the technology described herein.

2. Data Acquisition and Processing

MIRED data acquisition and processing according to some exemplary embodiments is illustrated in FIGS. 5(b)-5(d). The digitizer records the excitation pulses train measured by the MCT and the heating curve measured by photodiode simultaneously. The transient energy deposition during the excitation process is evaluated by taking the derivative of the temperature rise over time. The mean value of energy deposition, normalized with pulse energy at each wavenumber, represents the relative absorption. The processing code can be implemented with, for example, Matlab.

3. Characterization of QCL Array Emission

FIGS. 7(a), 7(b) illustrate characterization of QCL array emission in time and spectral domain. FIG. 7(a) illustrates QCL array firing all 32 channels with 100 ns pulse width consecutively. The full emission takes 3.2 µs. FIG. 7(b) illustrates the same QCL array emission measured by an IR spectrometer. The consecutive channel has a wavenumber difference at 4 cm$^{-1}$. The QCL array emission spectrum is characterized by a Fourier-transform-based IR spectrometer (FT-IR Rocket, ARCoptix, for example). The output beam from the QCL array is attenuated by and reflective ND filter with OD value of 1. The attenuated beam is guided into the IR spectrometer. Spectrum is averaged by 20 times scan. The power of each laser output is calculated by dividing the measured average power of pulses train with power spectrum.

4. U87 Cancer Cells

The U87 brain cancer cells were cultured on 1 mm thickness CaF$_2$ substrate for 24 h and fixed with formalin. The medium was washed three times by phosphate-buffered saline. It was later sandwiched with coverslip with 0.15 mm thickness for imaging. For delipid groups, cells were cultured in delipidated (charcoal-striped) serum, in which most of the hydrophobic lipid species were removed and prepared in the same way for imaging.

5. Mouse Brain Tissue

The mouse brain slice was prepared from adult C57BL/6 J mice (age 14-16 weeks) was sacrificed and perfused transcardially with phosphate-buffered saline (PBS, 1×, PH 7.4, Thermo Fisher Scientific Inc.) solution and 10% formalin. After fixation, the brain was extracted and fixed in 10% formalin solution for 24 h. The fixed mouse brain was immersed in 1×PBS solution. The brain was sliced to coronal sections with a 100 µm thickness using an Oscillating Tissue Slicer (OST-4500, Electron Microscopy Sciences). Brain slices were gently transferred by a brush into 10% formalin solution for another 24 h fixation. Then the brain tissue was sectioned at 100-µm thickness on to CaF$_2$ substrate with 1 mm thickness. It was later sandwiched with coverslip with 0.15 mm thickness for imaging.

6. FTIR Measurement

The Fourier-transform infrared (FTIR) spectra were recorded using an attenuated total reflection FTIR spectrometer (Nicolet Nexus 670, Thermo Fisher Scientific). The measurements were conducted with a spectral resolution of 2 cm$^{-1}$, and each spectrum was acquired over 16 scans. Baseline corrections were automatically applied by the system prior to data collection. To compare with MIRED spectra, the FTIR absorbance data were first converted into percentage absorption and subsequently scaled by $\lambda^2$ to account for intensity variations due to diffraction-limited changes in the MIRED experimental wavelength range. The spectra for comparison are normalized locally from 950 to 1060 cm$^{-1}$ for better illustration.

7. Fluorescent Thermometry for Temperature Rise Characterization

Fluorescent thermometry is employed to accurately measure the temperature rise in the MIRED experiment. The thermally sensitive dye Rhodamine 6G (R6G) is utilized as the probe molecule, with a known temperature sensitivity (T) of 1.9%/K at room temperature. The fluorescence is excited by the same 532 nm continuous-wave laser used in the MIRED system, and the emission is collected using epi-detection with a dichroic mirror (FF535-SDi01, Semrock, for example) and a bandpass filter centered at 560 nm (FBH560-10, Thorlabs, for example). The fluorescence signal is detected by a photomultiplier tube (PMT, H7422-40, Hamamatsu, for example) and amplified with a wideband amplifier (DHPVA, FEMTO, for example). The intensity is DC-coupled to the same digitizer used in the MIRED system, operating at 250 MS/s. The temperature rise induced by MIRED is calculated using the relationship $T\Delta I_{R6G}/I_{R6G}$.

8. Single Color Mid-Infrared Photothermal Imaging

To validate the MIRED imaging results of cancer cells, mid-infrared photothermal imaging of fixed U87 cancer cells was performed using a single-color external cavity quantum cascade laser (EC-QCL, MIRCAT, Daylight Solution, for example). The EC-QCL was operated within the spectral range of 1000 cm$^{-1}$ to 1150 cm$^{-1}$, with a spectral resolution of 2 cm$^{-1}$. Mid-infrared photothermal images were captured wavelength by wavelength, acquiring a total of 75 frames. The imaging process was conducted via galvo scanning, with a pixel dwell time of 10 μs.

Figure 15A:
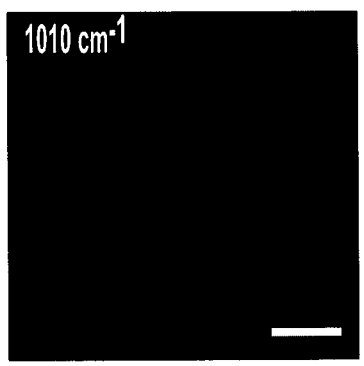
FIGS. 15(a), 15(b), 15(c), 15(d), 15(e), 15(f) illustrate single-color mid-infrared photothermal imaging of U87 cancer cells.
Figure 15B:
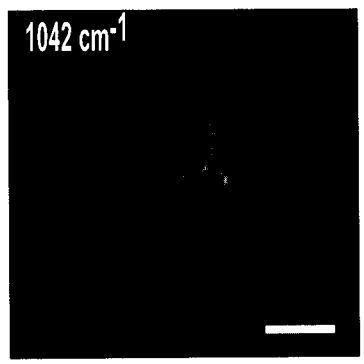
Figure 15C:
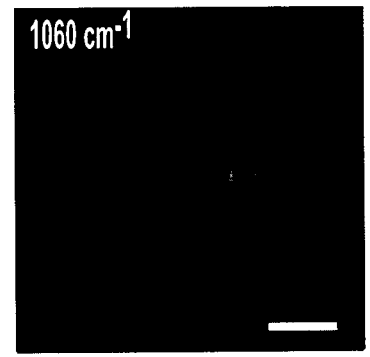
Figure 15D:
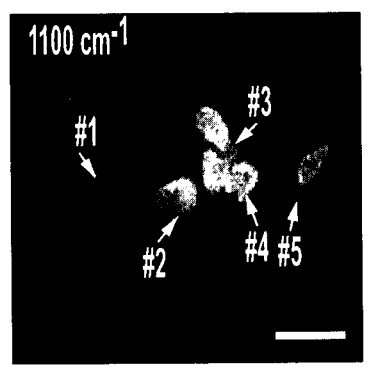
Figure 15E:
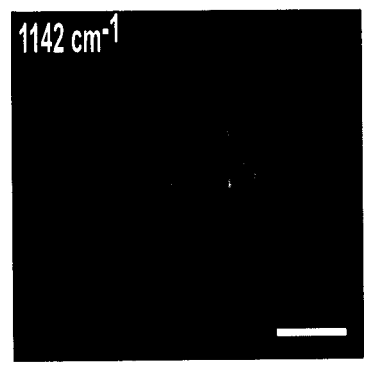
Figure 15F:
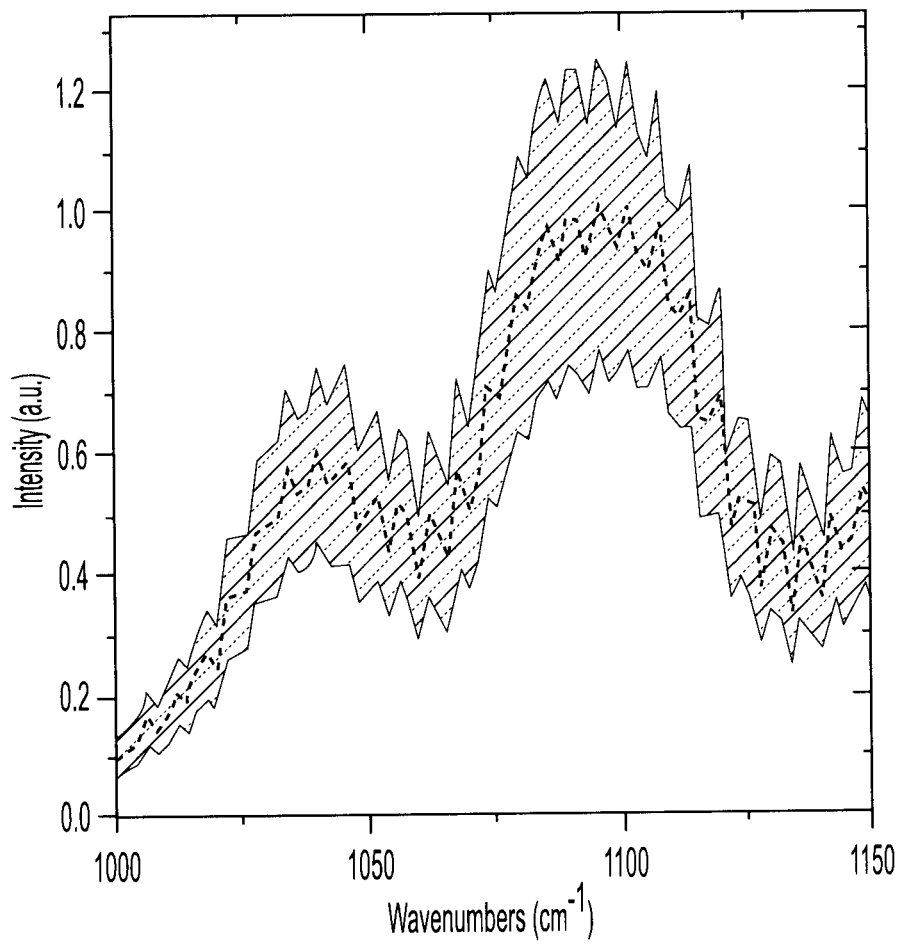

FIGS. 15(a), 15(b), 15(c), 15(d), 15(e), 15(f) illustrate single-color mid-infrared photothermal imaging of U87 cancer cells. FIGS. 15(a)-15(e) illustrate mid-infrared photothermal images at the specified wavenumbers obtained by discrete tuning of the EC-QCL. FIG. 15(f) illustrates an average spectrum of the cells shown in FIG. 15(d) within the range of 1000 cm$^{-1}$ to 1150 cm$^{-1}$. Statistical analysis was performed with N=5. Data are presented as mean±standard deviations.

TABLE 1

| QCL array characterization | | |
|---|---|---|
| Channel | Laser peaks (cm$^{-1}$) | Peak Power (mW) |
| 1 | 932.6842 | 0.2062896 |
| 2 | 936.1799 | 6.81494 |
| 3 | 939.7359 | 15.538028 |
| 4 | 943.2316 | 21.066276 |
| 5 | 946.8479 | 25.783516 |
| 6 | 951.4285 | 57.56388 |
| 7 | 955.1653 | 62.2446 |
| 8 | 958.8418 | 100.95756 |
| 9 | 962.5786 | 116.0896 |
| 10 | 966.3757 | 141.2532 |
| 11 | 970.1728 | 138.215 |
| 12 | 974.0301 | 146.28372 |
| 13 | 977.8272 | 170.57832 |
| 14 | 981.7448 | 160.71396 |
| 15 | 985.7227 | 166.7446 |
| 16 | 989.7608 | 62.93144 |
| 17 | 993.6182 | 148.786 |
| 18 | 997.7166 | 165.0066 |
| 19 | 1001.755 | 166.33144 |
| 20 | 1005.853 | 178.343 |
| 21 | 1010.072 | 167.96956 |
| 22 | 1014.231 | 163.48816 |
| 23 | 1018.51 | 156.33288 |
| 24 | 1022.669 | 113.63924 |
| 25 | 1026.948 | 147.3516 |
| 26 | 1031.287 | 154.6622 |
| 27 | 1035.627 | 155.122 |
| 28 | 1040.027 | 146.26568 |
| 29 | 1044.427 | 134.8204 |
| 30 | 1048.887 | 113.29296 |
| 31 | 1053.347 | 61.87016 |
| 32 | 1057.746 | 94.61716 |

The invention claimed is:

1. A microscopy system, comprising:
a source of pulsed infrared light for generating pulsed infrared excitation light for exciting a sample, such that the pulsed infrared light selectively heats the sample by absorption of the pulsed infrared light and allows the sample to cool;
a source of probe light for generating probe light for illuminating the sample;
a detection element for detecting a signal indicative of selective heating of the sample by the excitation light; and
a processor for receiving the signal indicative of the selective heating of the sample, computing a time rate of local temperature rise in the sample to obtain instantaneous absorption in the sample, and, using the instantaneous absorption, generating an image of the sample.

2. The microscopy system of claim 1, wherein the probe light has a wavelength of 532 nm.

3. The microscopy system of claim 1, wherein the source of the pulsed infrared light comprises a quantum cascade laser (QCL) array.

4. The microscopy system of claim 3, wherein the QCL array comprised a plurality of laser channels.

5. The microscopy system of claim 4, wherein the QCL array comprises 32 channels.

6. The microscopy system of claim 4, wherein the plurality of channels covers a fingerprint region from 940 cm$^{-1}$ to 1056 cm$^{-1}$.

7. The microscopy system of claim 3, wherein each laser of the laser array has a programmable pulse duration from 20 ns to 500 ns.

8. The microscopy system of claim 1, wherein the excitation light has a wavelength in a range of 1000 nm to 2500 nm.

9. A microscopy method, comprising:
generating pulsed infrared excitation light for exciting a sample, such that the pulsed infrared light selectively heats the sample by absorption of the pulsed infrared light and allows the sample to cool;
generating probe light for illuminating the sample;
detecting a signal indicative of selective heating of the sample by the excitation light; and
receiving the signal indicative of the selective heating of the sample, using the signal indicative of the selective heating of the sample, computing a time rate of local temperature rise in the sample to obtain instantaneous absorption in the sample, and, using the instantaneous absorption, generating an image of the sample.

10. The microscopy method of claim 9, wherein the source of the pulsed infrared light comprises a quantum cascade laser (QCL) array.

11. The microscopy method of claim 10, wherein the QCL array comprised a plurality of laser channels.

12. The microscopy method of claim 11, wherein the QCL array comprises 32 channels.

13. The microscopy method of claim 11, wherein the plurality of channels covers a fingerprint region from 940 cm$^{-1}$ to 1056 cm$^{-1}$.

14. The microscopy method of claim 10, wherein each laser of the laser array has a programmable pulse duration from 20 ns to 500 ns.

15. The microscopy method of claim 9, wherein the excitation light has a wavelength in a range of 1000 nm to 2500 nm.

16. A spectroscopy system, comprising:
- a source of pulsed infrared light for generating pulsed infrared excitation light for exciting a sample, such that the pulsed infrared light selectively heats the sample by absorption of the pulsed infrared light and allows the sample to cool;
- a source of probe light for generating probe light for illuminating the sample;
- a detection element for detecting a signal indicative of selective heating of the sample by the excitation light; and
- a processor for receiving the signal indicative of the selective heating of the sample, computing a time rate of local temperature rise in the sample to obtain instantaneous absorption in the sample, and, using the instantaneous absorption, generating a spectrum related to the sample.

17. The spectroscopy system of claim 16, wherein the probe light has a wavelength of 532 nm.

18. The spectroscopy system of claim 16, wherein the source of the pulsed infrared light comprises a quantum cascade laser (QCL) array.

19. The spectroscopy system of claim 18, wherein the QCL array comprised a plurality of laser channels.

20. The spectroscopy system of claim 19, wherein the QCL array comprises 32 channels.

21. The spectroscopy system of claim 19, wherein the plurality of channels covers a fingerprint region from 940 cm$^{-1}$ to 1056 cm$^{-1}$.

22. The spectroscopy system of claim 18, wherein each laser of the laser array has a programmable pulse duration from 20 ns to 500 ns.

23. The spectroscopy system of claim 16, wherein the excitation light has a wavelength in a range of 1000 nm to 2500 nm.

24. A spectroscopy method, comprising:
- generating pulsed infrared excitation light for exciting a sample, such that the pulsed infrared light selectively heats the sample by absorption of the pulsed infrared light and allows the sample to cool;
- generating probe light for illuminating the sample;
- detecting a signal indicative of selective heating of the sample by the excitation light; and
- receiving the signal indicative of the selective heating of the sample, using the signal indicative of the selective heating of the sample, computing a time rate of local temperature rise in the sample to obtain instantaneous absorption in the sample, and, using the instantaneous absorption, generating a spectrum related to the sample.

25. The spectroscopy method of claim 24, wherein the source of the pulsed infrared light comprises a quantum cascade laser (QCL) array.

26. The spectroscopy method of claim 25, wherein the QCL array comprised a plurality of laser channels.

27. The spectroscopy method of claim 26, wherein the QCL array comprises 32 channels.

28. The spectroscopy method of claim 26, wherein the plurality of channels covers a fingerprint region from 940 cm$^{-1}$ to 1056 cm$^{-1}$.

29. The spectroscopy method of claim 25, wherein each laser of the laser array has a programmable pulse duration from 20 ns to 500 ns.

30. The spectroscopy method of claim 24, wherein the excitation light has a wavelength in a range of 1000 nm to 2500 nm.

* * * * *